(12) United States Patent
Miyao

(10) Patent No.: US 7,345,821 B2
(45) Date of Patent: Mar. 18, 2008

(54) MICROLENS SUBSTRATE, A METHOD FOR MANUFACTURING THE MICROLENS SUBSTRATE, A LIQUID CRYSTAL PANEL, AND A PROJECTION TYPE DISPLAY APPARATUS

(75) Inventor: Nobuyuki Miyao, Shiojiri (JP)

(73) Assignee: Seiko Epson Corporation (JP)

( * ) Notice: Subject to any disclaimer, the term of this patent is extended or adjusted under 35 U.S.C. 154(b) by 2 days.

(21) Appl. No.: 11/513,975

(22) Filed: Aug. 31, 2006

(65) Prior Publication Data
US 2007/0047090 A1    Mar. 1, 2007

(30) Foreign Application Priority Data
Sep. 1, 2005 (JP) ............................... 2005-254182
Jun. 1, 2006 (JP) ............................... 2006-153925

(51) Int. Cl.
*G02B 27/10* (2006.01)
*G03B 21/60* (2006.01)

(52) U.S. Cl. ....................... 359/620; 359/619; 359/455; 359/900

(58) Field of Classification Search ................ 359/619, 359/620, 455, 900; 349/5, 95; 353/31, 33, 353/34, 81, 82
See application file for complete search history.

(56) References Cited

U.S. PATENT DOCUMENTS 6,310,168 B1* 10/2001 Shimizu et al. ............... 528/28
7,092,164 B2* 8/2006 Sakurai et al. ............... 359/626

FOREIGN PATENT DOCUMENTS

| JP | 2000-305072 | 11/2000 |
| JP | 2001-092365 | 4/2001 |
| JP | 2004-302380 | 10/2004 |

* cited by examiner

*Primary Examiner*—David Spector
*Assistant Examiner*—Jack Dinh
(74) *Attorney, Agent, or Firm*—Harness, Dickey & Pierce, P.L.C.

(57) ABSTRACT

A microlens substrate for an opposed substrate for use in a liquid crystal panel is provided. The microlens substrate includes: a substrate with concave portions having a plurality of concave portions; a convex lens substrate having convex lenses, each of the convex lenses having a shape corresponding to each of the concave portions, and the convex lens substrate being provided with respect to the substrate with concave portions so that the convex lenses are opposed to the corresponding concave portions, respectively; and a coating layer provided on the surface of the convex lens substrate which does not face the substrate with concave portions, the coating layer being mainly constituted of a product material produced by a reaction of a polysilazane compound with water, wherein the polysilazane compound is represented by the following formula (I):

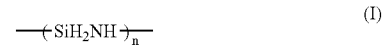

A method of manufacturing the microlens substrate, a liquid crystal panel provided with the microlens substrate, and a projection type display apparatus provided with the liquid crystal panel are also provided.

8 Claims, 7 Drawing Sheets

(e)

(f)

MICROLENS SUBSTRATE, A METHOD FOR MANUFACTURING THE MICROLENS SUBSTRATE, A LIQUID CRYSTAL PANEL, AND A PROJECTION TYPE DISPLAY APPARATUS

CROSS-REFERENCE TO RELATED APPLICATION

This application claims priorities to Japanese Patent Application No. 2005-254182 filed on Aug. 31, 2005 and Japanese Patent Application No. 2006-153925 filed on Jun. 1, 2006, which are hereby expressly incorporated by reference herein in their entireties.

BACKGROUND OF THE INVENTION

1. Field of the Invention

This invention relates to a microlens substrate, a method for manufacturing the microlens substrate, a liquid crystal panel, and a projection type display apparatus, and more specifically to a microlens substrate for use in an opposed substrate for a liquid crystal panel, a method for manufacturing the microlens substrate, a liquid crystal panel provided with the microlens substrate, and a projection type display apparatus provided with the liquid crystal panel.

2. Description of the Related Art

There is known a projection type display apparatus that projects an image on a screen. In most of such projection type display apparatuses, a liquid crystal panel (liquid crystal light shutter) is normally used for forming the image.

Such a liquid crystal panel has a configuration in which, for example, an opposed substrate for a liquid crystal panel which is provided with a black matrix, a common electrode and the like is joined to a liquid crystal driving substrate (TFT substrate) which is provided with a large number of thin film transistors (TFT) for controlling respective pixels and a large number of pixel electrodes via a liquid crystal layer.

In the liquid crystal panel (TFT liquid crystal panel) having such a configuration, for the purposes of preventing TFT elements from being deteriorated due to light energy of transmitted light and improving contrast of an image, the black matrix is formed in a portion of the opposed substrate for a liquid crystal panel other than the portions thereof that correspond to the respective pixels. For this reason, a region of the liquid crystal panel through which light can transmit is restricted. This makes light transmittance be lowered.

In order to improve the light transmittance for the liquid crystal panel, there is known an opposed substrate for a liquid crystal panel in which a black matrix and/or a common electrode are formed on a microlens substrate provided with a large number of minute microlenses at the positions corresponding to the respective pixels in the opposed substrate for a liquid crystal panel. According to such a liquid crystal panel, light transmitting the opposed substrate for a liquid crystal panel is condensed into openings formed in the black matrix, and this makes it possible to improve light transmittance.

One example of a method of forming such a microlens substrate is disclosed in JP-A 2001-92365. In this method, an uncured photocuring resin material is supplied onto one major surface of a substrate with concave portions in which a plurality of concave portions for forming microlenses are formed. Then, a flat transparent glass substrate is brought into contact with and pressed against the supplied photocuring resin material to thereby cure the supplied photocuring resin material so that the glass substrate is joined to the supplied photocuring resin. Thereafter, the glass substrate is ground and polished so that the glass substrate becomes a cover glass having a predetermined thickness.

However, the method mentioned above requires many manufacturing steps and thus it takes a considerably long time for manufacturing a microlens substrate. Therefore, use of the method gives a large affect to the manufacturing cost of a liquid crystal panel. Further, since a large amount of grinding or polishing particles are generated in the grinding and polishing steps, it is necessary to wash the substrate during and after the grinding and polishing steps. Since such washing is carried out using a large quantity of water, it is not desirable from the viewpoints of natural resource saving and environmental concerns. In addition, there is a case that the photocuring resin material is deteriorated through the washing step, which may result in the case where the product quality of the manufactured opposed substrate for a liquid crystal panel is deteriorated. Further, even in the case where such washing is carried out, there is a possibility that grinding or polishing particles still remain on the manufactured microlens substrate (that is, on the opposed substrate for a liquid crystal panel), so that it is difficult to raise the reliability of the manufactured microlens substrate to a sufficiently high level.

Further, it may be conceived that the grinding and polishing of the glass substrate are omitted. However, this method is not preferable in view of the optical characteristics of the microlens substrate because the thickness of the microlens substrate becomes a considerable thickness. Further, use of such a microlens substrate having the considerable thickness leads to an increased size of a projection type display apparatus.

Furthermore, it may also be conceived that the surface of the glass substrate used for pressing the photocuring resin material is subjected to a releasing mold treatment so that the surface of the cured photocuring resin material is not covered with the glass substrate (cover glass). However, this method involves problems such as follows.

Namely, in general, photocuring resins have poor heat resistance, and therefore there is a case that the constituent material (photocuring resin material) of the microlens substrate is deteriorated due to heat applied when a black matrix and a common electrode are formed on the photocuring resin material constituting the microlens substrate, in particular when they are formed by a chemical vapor deposition method. Further, in general, hardness (shape stability) of photocuring resins even after they have been cured is not so high as compared to inorganic materials, and thus deformation is likely to occur in the cured photocuring resin material when any pressure is applied thereto. This means that if such a photocuring resin material is used as a constituent material of a liquid crystal panel, there is a possibility that any deformation occurs therein. When such deformation occurs, Color Heterogeneity (uneven color distribution) occurs in an image to be displayed by the liquid crystal panel, which results in a lowered image quality of an image to be displayed.

SUMMARY OF THE INVENTION

Accordingly, it is an object of the invention to provide a microlens substrate for an opposed substrate which has excellent optical characteristics and durability and can be suitably used in a liquid crystal panel.

Further, it is another object of the invention to provide a method of manufacturing a microlens substrate by which such a microlens substrate mentioned above can be manufactured easily and reliably.

Furthermore, it is other object of the invention to provide a liquid crystal panel provided with the microlens substrate and a projection type display apparatus provided with the liquid crystal panel described above.

In order to achieve the above objects, one aspect of the invention is directed to a microlens substrate for an opposed substrate for use in a liquid crystal panel. The microlens substrate of the invention includes: a substrate with concave portions having a plurality of concave portions on one of the major surfaces thereof; a convex lens substrate having convex lenses on one of the major surfaces thereof, each of the convex lenses having a shape corresponding to each of the concave portions of the substrate with concave portions, and the convex lens substrate being provided with respect to the substrate with concave portions so that the convex lenses are opposed to the corresponding concave portions, respectively; and a coating layer provided on the other major surface of the convex lens substrate, the coating layer being mainly constituted of a product material produced by a reaction of a polysilazane compound with water.

According to the invention described above, it is possible to provide a microlens substrate for an opposed substrate which has excellent optical characteristics and durability and can be suitably used in manufacturing a liquid crystal panel.

In the microlens substrate of the invention, it is preferable that the polysilazane compound is represented by the following formula (I):

(I)

This makes it possible to make the optical characteristics and durability of the microlens substrate more excellent.

Further, in the microlens substrate of the invention, it is preferable that the pencil hardness of the constituent material of the coating layer is 5H or higher.

This makes it possible to prevent the microlens substrate from being deformed upon manufacturing a liquid crystal panel more efficiently, and thus it is possible to improve reliability of the obtained liquid crystal panel.

Furthermore, in the microlens substrate of the invention, it is preferable that the coating layer is formed of a composition of which viscosity at room temperature is in the range of 0.5 to 10 mPa·s.

This also makes it possible to manufacture a microlens substrate having excellent optical characteristics and reliability easily and surely. Further, this also makes it possible to effectively prevent air bubbles from intruding between the convex lens substrate and the coating layer, and thus it is possible to further improve adhesion between the convex lens substrate and the coating layer. As a result, the microlens substrate can have more excellent reliability and optical characteristics. Furthermore, this also makes it possible to form a coating layer having an optimum thickness easily and reliably when manufacturing the microlens substrate.

Moreover, in the microlens substrate of the invention, it is preferable that a thickness of the coating layer is in the range of 0.1 to 5.0 μm.

This also makes it possible to make the optical characteristics and durability of the microlens substrate more excellent.

Another aspect of the invention is directed to a method of manufacturing a microlens substrate for use in an opposed substrate for a liquid crystal panel. The method comprising the steps of: preparing a substrate with concave portions having a plurality of concave portions on one of the major surfaces thereof; applying a convex lens substrate formation composition having fluidity onto the one major surface of the substrate with concave portions where the plurality of concave portions are formed; obtaining a convex lens substrate having a plurality of convex lenses by solidifying the convex lens substrate formation composition; applying a coating layer formation composition having a fluidity and containing a polysilazane compound onto the surface of the convex lens substrate which does not face the substrate with concave portions; and forming a coating layer on the surface of the convex lens substrate by curing the coating layer formation composition by reacting the polysilazane compound with water.

According to the manufacturing method mentioned above, it is possible to manufacture a microlens substrate for an opposed substrate which has excellent optical characteristics and durability and can be suitably used in manufacturing a liquid crystal panel easily and reliably. Further, it is also possible to effectively prevent air bubbles from intruding between the convex lens substrate and the coating layer, and thus it is possible to further improve adhesion between the convex lens substrate and the coating layer. As a result, the microlens substrate can have more excellent reliability and optical characteristics.

The other aspect of the invention is directed to a liquid crystal panel provided with a microlens substrate for use in an opposed substrate for the liquid crystal panel. In this liquid crystal panel, the microlens substrate includes a substrate with concave portions having a plurality of concave portions on one of the major surfaces thereof; a convex lens substrate having convex lenses on one of the major surfaces thereof, each of the convex lenses having a shape corresponding to each of the concave portions, and a coating layer. The convex lens substrate is provided with respect to the substrate with concave portions so that the convex lenses are opposed to the corresponding concave portions of the substrate with concave portions, respectively. Further, the coating layer is provided on the other major surface of the convex lens substrate, and the coating layer is mainly constituted of a product material produced by a reaction of a polysilazane compound with water.

This also makes it possible to provide a liquid crystal panel having excellent optical characteristics and durability.

Still other aspect of the invention is directed to a projection type display apparatus having a light source and at least one light valve. In the projection type display apparatus, the light valve includes a liquid crystal panel provided with a microlens substrate for use in an opposed substrate for a liquid crystal panel, and the microlens substrate includes a substrate with concave portions, a convex lens substrate having microlenses each having a shape corresponding to each of the concave portions of the substrate with concave portions, and a coating layer provided on the convex lens substrate. In the microlens substrate, the convex lens substrate is provided with respect to the substrate with concave portions so that the convex lenses are opposed to the corresponding concave portions of the substrate with concave portions, respectively. The coating layer is provided on the surface of the convex lens substrate which does not face the substrate with concave portions, and the coating layer is mainly constituted of a product material produced by a reaction of a polysilazane compound with water.

This also makes it possible to provide a projection type display apparatus which has excellent optical characteristics and durability, and can display an excellent image for a long time stably.

The foregoing and other objects, features and advantages of the invention will become more readily apparent from the following detailed description of preferred embodiments of the invention which proceeds with reference to the appending drawings.

DETAILED DESCRIPTION OF THE INVENTION

Preferred embodiments of a microlens substrate, a liquid crystal panel and a projection type display apparatus according to the invention will now be described in detail with reference to the appending drawings.

Figure 1:
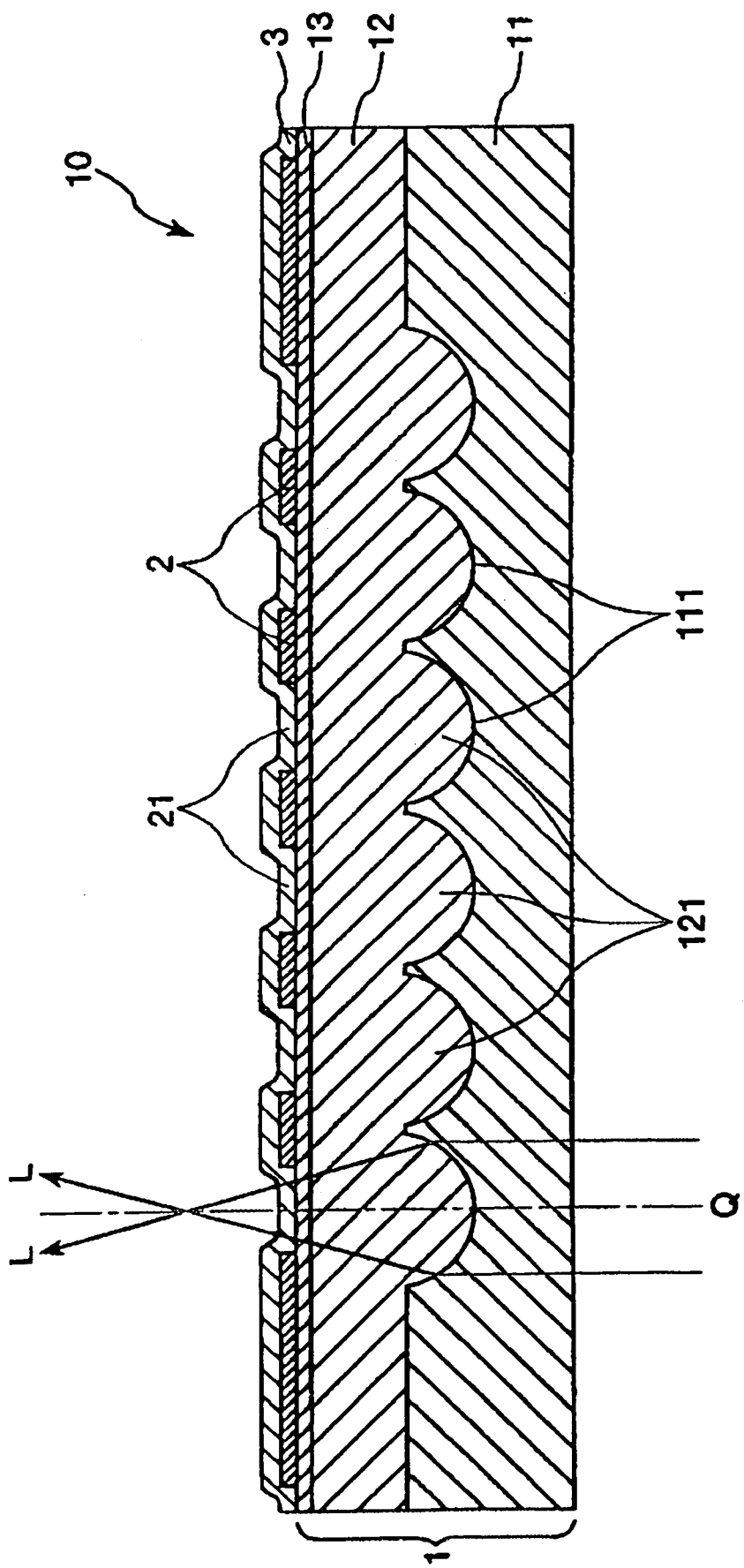
FIG. 1 is a schematic longitudinal cross-sectional view which shows an opposed substrate for a liquid crystal panel provided with a microlens substrate of the invention.
Figure 2:
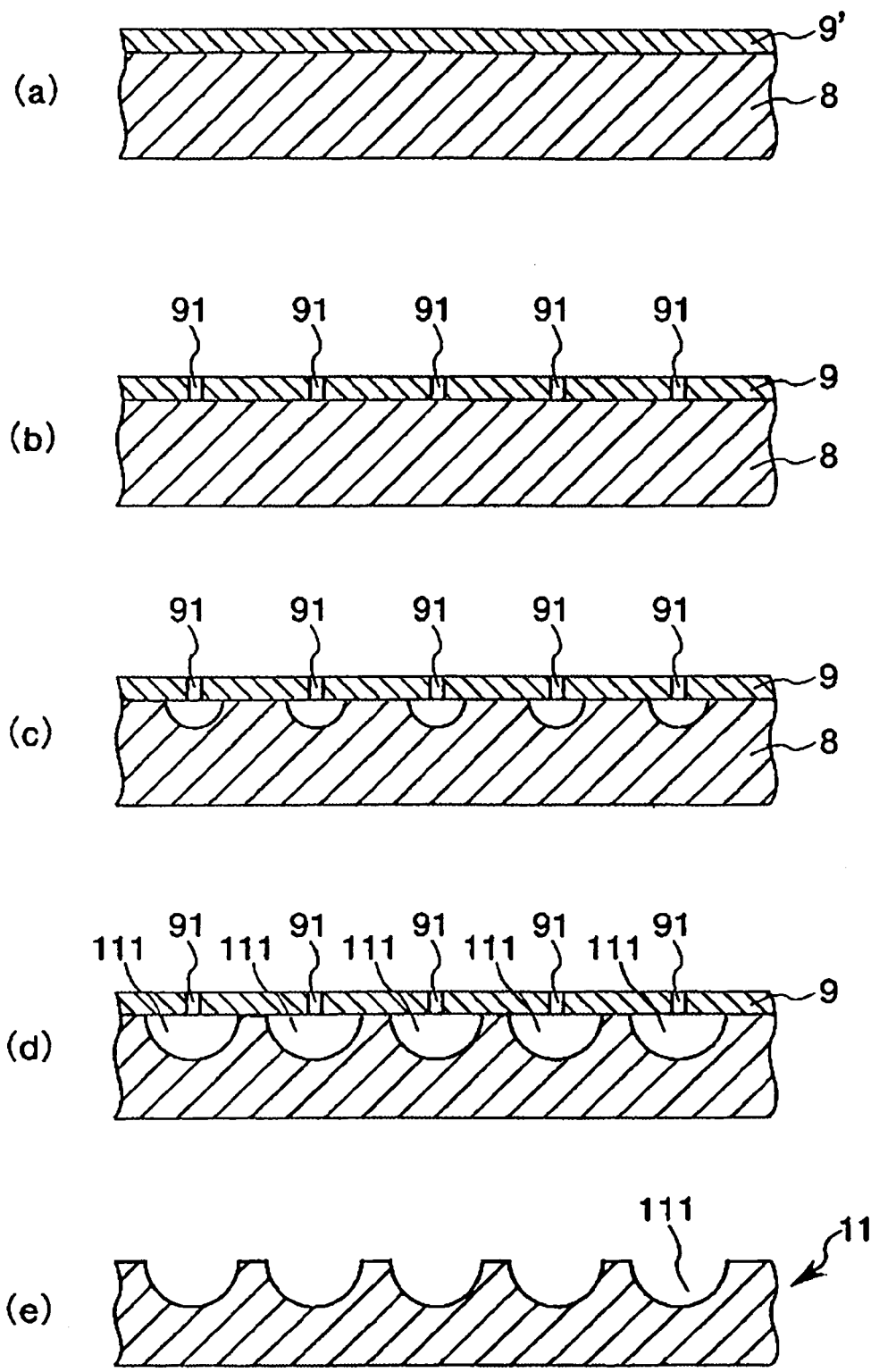
FIG. 2 is a schematic longitudinal cross-sectional view which shows a method of manufacturing a substrate with concave portions for forming a microlens substrate of the invention.
Figure 3:
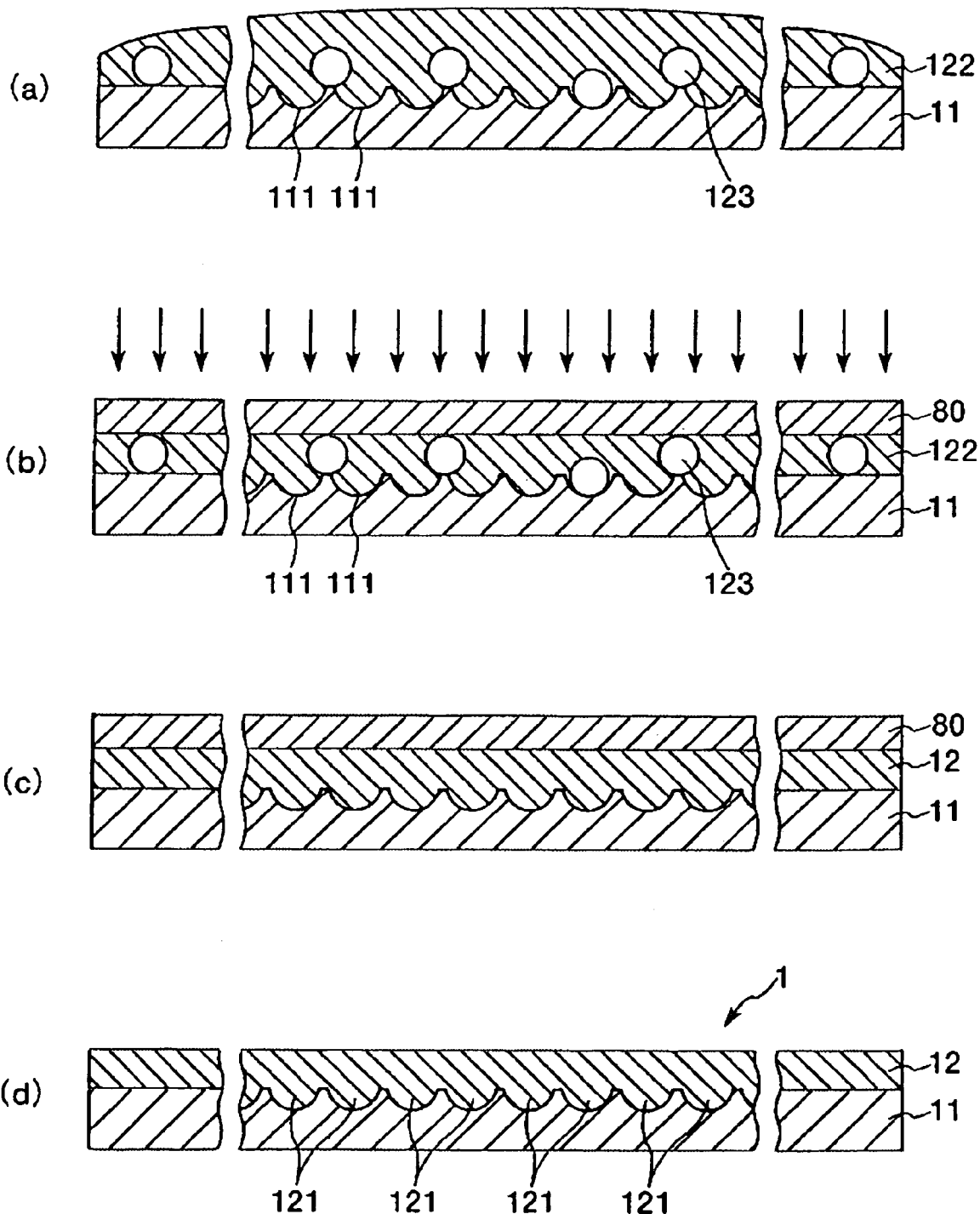
FIG. 3 is a schematic longitudinal cross-sectional view which shows a method of manufacturing the microlens substrate of a first embodiment of the invention.
Figure 4:
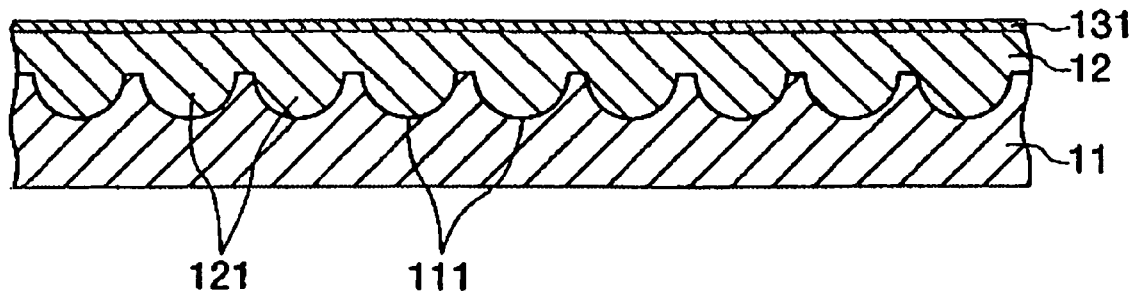
FIG. 4 is also a schematic longitudinal cross-sectional view which shows a method of manufacturing the microlens substrate of the fist embodiment.
Figure 4:
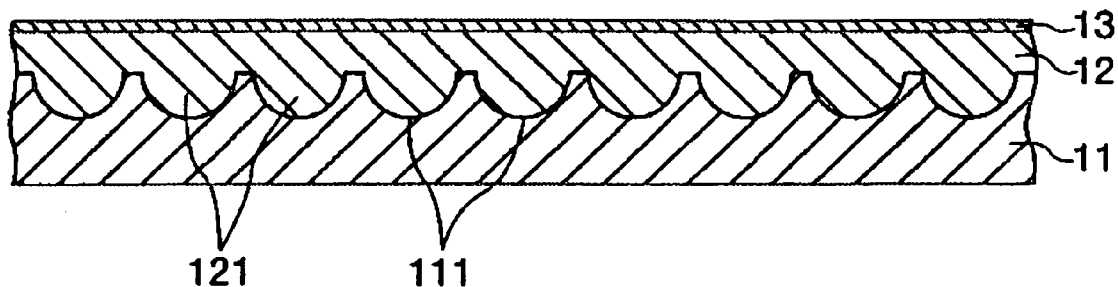

FIG. 1 is a schematic longitudinal cross-sectional view which shows an opposed substrate for a liquid crystal panel provided with a microlens substrate of the invention, FIG. 2 is a schematic longitudinal cross-sectional view which shows a method of manufacturing a substrate with concave portions for forming a microlens substrate of the invention, and FIGS. 3 and 4 are schematic longitudinal cross-sectional views which show a method of manufacturing the microlens substrate of the first embodiment of the invention.

<Microlens Substrate and Opposed Substrate for Liquid Crystal Panel>

First, a description will be given for a microlens substrate and an opposed substrate for a liquid crystal panel provided with the microlens substrate.

As shown in FIG. 1, the microlens substrate 1 is constituted from a substrate 11 with concave portions, a convex lens substrate 12 and a coating layer 13.

Further, the substrate 11 with concave portions is made of a glass material, and has a plurality of concave portions (concave portions for microlenses) 3 on one major surface thereof.

Although an index of refraction of the glass material constituting the substrate 11 with concave portions with respect to light having a wavelength of 550 nm is not particularly limited, it is preferable that the index of refraction of the glass material is in the range of 1.40 to 1.55, and more preferably it is in the range of 1.46 to 1.50. This makes it possible to improve the optical characteristics of the microlens substrate 1 further.

As for the glass material constituting the substrate 11 with concave portions, for example, soda-lime glass, crystalline glass, quartz glass, lead glass, potassium glass, borosilicate glass, alkali-free glass and the like may be mentioned. Among these materials, it is preferable to use quartz glass. The quartz glass has high mechanical strength and heat resistance. Further, the quartz glass also has very low coefficient of linear expansion, and it is hardly deformed even if heat is applied thereto. Moreover, the quartz glass also has an advantage that it is hardly deteriorated due to light energy because it has high light transmittance for light of a short wavelength range.

Although the diameter of each of the concave portions 111 when viewed from above the microlens substrate 1 is not particularly limited, it is preferable that the diameter is in the range of 5 to 100 μm, and more preferably it is in the range of 10 to 50 μm. Thus, in the case where the diameter of each of the concave portions 111 lies within the above ranges, it is possible to improve resolution of an image projected by a liquid crystal panel provided with the microlens substrate 1 sufficiently. In addition, in a method of manufacturing the microlens substrate 1 (will be described later), it is possible to form the microlenses 121 of the convex lens substrate 12 without a space between each of the microlenses 121 and the corresponding concave portion of the substrate 11 with concave portions, and therefore, it is possible to improve adhesion between the substrate 11 with concave portions and the convex lens substrate 12 sufficiently.

Further, it is preferable that the average radius of curvature of each of the concave portions 111 is in the range of 2.5 to 50 μm, and more preferably it is in the range of 5 to 25 μm. Thus, in the case where the average radius of curvature thereof lies within the above ranges, the microlens substrate 1 can have excellent optical characteristics, in particular.

Moreover, the depth of each of the concave portions 111 is preferably in the range of 2.5 to 50 μm, and more preferably it is in the range of 5 to 25 μm. Thus, in the case where the depth thereof lies within the above ranges, the microlens substrate 1 can have excellent optical characteristics. In addition, it is possible to improve adhesion between the substrate 11 with concave portions and the convex lens substrate 12.

The convex lens substrate 12 is mainly formed of a constituent material having transparency. Examples of such a material having transparency include thermosetting resins such as epoxy-based resin, acryl-based resin, phenol-based resin, urethane-based resin, and polyimide-based resin; photocuring resins; thermoplastic resins such as polyolefins (e.g. polyethylene, polypropylene, ethylene-propylene copolymer, ethylene-vinyl acetate copolymer (EVA) and the like), denatured polyolefin, polyamide (e.g. nylon 6, nylon 46, nylon 66, nylon 610, nylon 612, nylon 11, nylon 12, nylon 6-12, nylon 6-66), thermoplastic polyimide, polyamide-imide, liquid crystal polymers such as aromatic polyester, polyphenylene oxide, polyphenylene sulfide, polycarbonate, polymethylmethacrylate, polyether, polyether ether ketone, polyetherimide, polyacetal, and the like; various thermoplastic elastomers such as styrene based elastomer, polyolefin based elastomer, polyvinylchloride based elastomer, polyurethane based elastomer, polyester based elastomer, polyamide based elastomer, polybutadiene based elastomer, trans-polyisoprene based elastomer, fluorocarbon rubber based elastomer, chlorinated polyethylene based elastomer and the like; and copolymers, blended bodies and polymer alloys and the like having at least one of these materials as a main ingredient. Further, an organic-inorganic composite material may be used as a constituent material of the convex lens substrate 12. In the case where the convex lens substrate 12 is formed of such an organic-inorganic composite material, it is possible to improve the optical characteristics of the microlens substrate 1, in particular. In addition, the organic-inorganic composite material has high hardness as well as excellent optical characteristics (such as light transmittance) and heat resistance. Further, among the various constituent materials, the organic-inorganic composite material has excellent affinity with a constituent material of a coating layer 13 described later. Therefore, it is possible to provide excellent adhesion between the convex lens substrate 12 and the coating layer 13, thus leading to excellent durability and reliability of the microlens substrate 1. Hereinbelow, the organic-inorganic composite material will be described in detail. In this regard, however, it should be noted that the constituent material of the convex lens substrate 12 is not limited thereto.

In this specification, the term "organic-inorganic composite material" means a material having a chemical structure in which an organic component is bonded to an inorganic component by means of a covalent bonding.

The organic-inorganic composite material has a chemical structure which is the same as that of the glass material in its molecule. Therefore, the organic-inorganic composite material has high affinity with the glass material. As a result, if the convex lens substrate 12 is formed of the organic-inorganic composite material, the adhesion between the convex lens substrate 12 and the substrate with convex portions constituted from a glass material can be made excellent.

As described above, the organic-inorganic composite material has a chemical structure in which an organic component is bonded to an inorganic component by means of a covalent bonding.

Although there is no particular limitation on the organic component constituting the organic-inorganic composite material, it is preferable to use materials having thermosetting property. This makes it possible to improve light resistance of the convex lens substrate 12, in particular.

Examples of such an organic component of the organic-inorganic composite material include epoxy resin (epoxy component), acryl based resin (acryl based component), phenol based resin (phenol based component), urethane based resin (urethane based component), polyimide based resin (polyimide based resin), and the like may be mentioned. Among these resins, the epoxy resin (epoxy component) or the acryl based resin (acryl based component) is preferable. In the case where the organic component of the organic-inorganic composite material is epoxy resin (epoxy component) or acryl based resin (acryl based component), it is possible to improve affinity between the constituent material of the substrate 11 with concave portions and the constituent material of the convex lens substrate 12, in particular, and as a result, the adhesion between the convex lens substrate 12 and the substrate 11 with convex portions constituted from a glass material can be made excellent. Further, it is possible to improve handleability of the organic-inorganic composite material (composition 122 as a precursor of the organic-inorganic composite material) upon manufacturing a microlens substrate 1, in particular, and therefore, it is possible to prevent a gap from being created between the concave portions 111 of the substrate 11 with concave portions and the corresponding microlens 121 of the convex lens substrate 12 more surely, and it is possible to improve adhesion between the substrate 11 with concave portions and the convex lens substrate 12, in particular. As a result, the microlens substrate 1 can have excellent optical characteristics and durability. Moreover, in the case where the organic component of the organic-inorganic composite material is epoxy resin (epoxy component), it is possible to facilitate formation of an arbitrary shape, in the present embodiment, formation of a flat surface at a curing process. Furthermore, in the case where the organic component of the organic-inorganic composite material is acrylic-based resin (acrylic-based component), it is possible to heighten the light transmittance, in particular.

Further, examples of the inorganic component constituting the organic-inorganic composite material include organopolysiloxane, silica and the like. Among these materials, silica is preferable. In the case where the inorganic component constituting the organic-inorganic composite material is silica, it is possible to particularly improve durability (such as heat resistance and light resistance) of the convex lens substrate 12, and it is also possible to improve adhesion between the convex lens substrate 12 and the coating layer 13, in particular.

Further, in the case where the organic-inorganic composite material constituting the convex lens substrate 12 is the epoxy resin-silica composite material, it is preferable that an amount of silica component contained in the epoxy resin-silica composite material is in the range of 20 to 50 wt %, and more preferably it is in the range of 25 to 45 wt %. In the case where the amount of epoxy resin lies within the above ranges, it is possible to improve adhesion between the convex lens substrate 12 provided with the plurality of microlenses 121 each having an appropriate shape and the substrate 11 with concave portions while particularly improving durability (such as heat resistance and light resistance) of the convex lens substrate 12. In addition, adhesion between the convex lens substrate 12 and the coating layer 13 can also be made excellent.

Furthermore, in the case where the organic-inorganic composite material constituting the convex lens substrate 12 is the epoxy resin-silica composite material, it is preferable that an amount of epoxy resin contained in the epoxy resin-silica composite material is in the range of 50 to 80 wt %, and more preferably it is in the range of 55 to 75 wt %. In the case where the amount of epoxy resin lies within the above ranges, it is possible to improve adhesion between the convex lens substrate 12 provided with the plurality of microlenses 121 each having an appropriate shape and the substrate 11 with concave portions while particularly improving durability (such as heat resistance and light resistance) of the convex lens substrate 12. In addition, adhesion between the convex lens substrate 12 and the coating layer 13 can also be made excellent.

Moreover, in the case where the organic-inorganic composite material constituting the convex lens substrate 12 is an acrylic-based resin-silica composite material, it is preferable that an amount of silica component contained in the acrylic-based resin-silica composite material is in the range of 10 to 20 wt %, and more preferably it is in the range of 12 to 18 wt %. In the case where the amount of silica lies within the above ranges, it is possible to improve adhesion between the convex lens substrate 12 provided with the plurality of microlenses 121 each having an appropriate shape and the substrate 11 with concave portions while particularly improving durability (such as heat resistance and light resistance) of the convex lens substrate 12. In addition, adhesion between the convex lens substrate 12 and the coating layer 13 can also be made excellent.

Furthermore, in the case where the organic-inorganic composite material constituting the convex lens substrate 12 is the acrylic-based resin-silica composite material, it is preferable that an amount of acrylic-based resin contained in the epoxy resin-silica composite material is in the range of 80 to 90 wt %, and more preferably it is in the range of 82 to 88 wt %. In the case where the amount of acrylic-based resin lies within the above ranges, it is possible to improve adhesion between the convex lens substrate 12 provided with the plurality of microlenses 121 each having an appropriate shape and the substrate 11 with concave portions while particularly improving durability (such as heat resistance and light resistance) of the convex lens substrate 12. In addition, adhesion between the convex lens substrate 12 and the coating layer 13 can also be made excellent.

In this regard, the constituent material of the convex lens substrate 12 may contain a constituent component other than the organic-inorganic composite material as described above. For example, the convex lens substrate 12 may contain metal oxide such as titanium oxide, zirconium oxide and aluminum oxide as the constituent components in addition to the organic-inorganic composite material. This makes it possible to heighten an index of refraction of the convex lens substrate 12 further, and it is possible to improve the optical characteristics of the microlens substrate 1 further. In the case where the convex lens substrate 12 is formed of a material containing metal oxide, it is preferable that an amount of the metal oxide contained in the constituent material of the convex lens substrate 12 is in the range of 1 to 40 wt %. In the case where the amount of the metal oxide lies within the above range, it is possible to heighten the index of refraction of the constituent material of the convex lens substrate 12 while improving the durability thereof and the like sufficiently.

Further, it is preferable that light transmittance of light having a wavelength in the range of 400 to 800 nm with respect to the convex lens substrate 12 is 90% or more, and more preferably it is 95% or more. This makes it possible to project a brighter image when a liquid crystal panel 1 provided with the microlens substrate 1 is used.

Moreover, the organic-inorganic composite material as the constituent material of the convex lens substrate 12 has a sufficiently high index of refraction. This makes it possible to improve optical characteristics of the microlens substrate 1 sufficiently. More specifically, it is preferable that an index of refraction of the constituent material of the convex lens substrate 12 with respect to light having a wavelength of 550 nm is in the range of 1.47 to 1.70, more preferably it is in the range of 1.50 to 1.70, and further more preferably it is in the range of 1.55 to 1.70. Hereinafter, "an index of refraction" in this specification indicates the index of refraction with respect to light having a wavelength of 550 nm unless otherwise noted.

The absolute value of the difference between an index of refraction of the glass material constituting the substrate 11 with concave portions with respect to light having a wavelength of 550 nm and an index of refraction of the constituent material of the convex lens substrate with respect to light having a wavelength of 550 nm is preferably 0.01 or more, and more preferably it is 0.10 or more. This makes the optical characteristics of the microlens substrate 12 more suitable.

The convex lens substrate 12 is provided with a plurality of microlenses 121 as convex lenses each of which has the shape corresponding to that of each concave portion 111 of the substrate 11 with concave portions. Each of the microlenses 121 is formed so as to fill the inside of each of the concave portions 111 of the substrate 11 with concave portions with the organic-inorganic composite material. In this way, the convex lens substrate 12 adheres tightly to the substrate 11 with concave portions.

The shape of each of the microlenses 121 of the convex lens substrate 12 is similar to the shape of each of the concave portions 111 of the substrate 11 with concave portions except for the relation between the convex portion and the concave portion.

Thus, although the diameter of each of the microlenses (convex lenses) 121 when viewed from above the microlens substrate 1 is not particularly limited, it is preferable that the diameter is in the range of 5 to 100 μm, and more preferably it is in the range of 10 to 50 μm. Thus, in the case where the diameter of each of the microlenses 121 lies within the above ranges, it is possible to improve resolution of an image projected by a liquid crystal panel provided with the microlens substrate 1 sufficiently. In addition, it is possible to improve adhesion between the substrate 11 with concave portions and the convex lens substrate 12 sufficiently.

Further, it is preferable that the average radius of curvature of each of the microlenses 121 is in the range of 2.5 to 50 μm, and more preferably it is in the range of 5 to 25 μm. Thus, in the case where the average radius of curvature thereof lies within the above ranges, the microlens substrate 1 can have excellent optical characteristics, in particular.

Moreover, the height of each of the microlenses 121 is in the range of 5 to 100 μm, and more preferably it is in the range of 10 to 50 μm. Thus, in the case where the height thereof lies within the above ranges, the microlens substrate 1 can have excellent optical characteristics. In addition, it is possible to improve adhesion between the substrate 11 with concave portions and the convex lens substrate 12, in particular.

The coating layer 13 is mainly formed of a product material produced by a reaction of a polysilazane compound with water (hereinafter, this product material will be referred as "polysilazane reaction product" on occasions).

In this invention, by providing a coating layer constituted from the polysilazane reaction product having excellent properties as described below in the microlens substrate 1, the microlens substrate becomes capable of being used in a liquid crystal panel (in particular, a liquid crystal panel for used in a projection type display apparatus) preferably. Hereinbelow, a description will be made with regard to the polysilazane reaction product in more details.

The polysilazane reaction product constituting the coating layer 13 is a product produced by a reaction of a polysilazane reaction compound with water. Therefore, according to the invention, it is possible to prevent generation of particles effectively when the coating layer is formed. In more details, according to the conventional method, that is, the method in which after the glass substrate is joined to the surface of the convex lens substrate, the glass substrate is ground and polished to obtain a cover glass, grinding or polishing particles are unavoidably generated. In contrast, according to the invention, since the coating layer constituted from the polysilazane reaction product is provided, generation of such grinding or polishing particles are prevented. Therefore, the reliability of the manufactured microlens substrate can be especially improved. Further, in the conventional method, there is a possibility that the glass substrate (cover glass) is floated up or peeled off from the convex lens substrate or crack is caused in the glass substrate (cover glass) when an excessive force is added to the boundary between the convex lens substrate and the glass substrate (cover glass) upon the glass substrate being ground. However, such problems do not occur in the invention, and thus yielding percentage of the microlens substrate can be improved.

Further, the photocuring resin used in the conventional method is likely to be affected by light even after the resin has been cured, while the polysilazane reaction product used in the invention has excellent stability against light. In particular, the polysilazane reaction product also has excellent stability against light having a short wavelength which is a large factor for the deterioration of the photocuring resin used in the conventional method. Therefore, the microlens substrate provided with the coating layer constituted from the polysilazane reaction product can be preferably used in a liquid crystal panel (in particular, in a liquid crystal panel which is used in a projection type display apparatus in which light of high intensity is emitted) without being deteriorated with elapse of time.

Furthermore, the polysilazane reaction product used in the invention also has excellent heat resistance. Therefore, deterioration of the constituent material of the microlens substrate is hardly caused even when a black matrix or a common electrode are formed on the microlens substrate. In addition, in the case of a liquid crystal panel, in particular in the case of a liquid crystal panel used in a projection type display apparatus, the liquid crystal panel itself becomes high temperature when used, and thus the microlens substrate constituting the liquid crystal panel is also required to have high heat resistance. According to the invention, it is possible to satisfy such requirement sufficiently. Therefore, by the provision of such a coating layer constituted from the polysilazane reaction product, the manufactured microlens substrate can have excellent reliability and durability.

Moreover, the polysilazane reaction product constituting the coating layer has high hardness. This is preferable due to the following reason. Namely, if the hardness of a microlens substrate used in a liquid crystal panel is insufficient, deformation is likely to occur in the microlens substrate due to pressure applied thereto. If such a deformed microlens substrate is used in a liquid crystal panel, it becomes difficult to keep the gap between the opposed substrate (microlens substrate) and the TFT substrate constant, and as a result there is a possibility that defects such as uneven color distribution will be caused in an image to projected. For this reason, the high hardness property of the polysilazane reaction product is preferable. More specifically, it is preferable that the pencil hardness of the polysilazane reaction product constituting the coating layer is 5H or higher, more preferably 7H or higher, and further more preferably 9H or higher.

Moreover, the polysilazane reaction product constituting the coating layer also has low coefficient of water adsorption and thus it has excellent chemical stability. Therefore, in the microlens substrate, deterioration with elapse of time and changes in volume due to swelling-up are difficult to occur. In this regard, the coefficient of water adsorption is preferably 0.5 vol % or less, and more preferably 0.1 vol % or less.

The polysilazane reaction product constituting the coating layer has the excellent properties as described above. Therefore, according to the invention, it is not necessary to use a cover glass which is an essential component in the conventional microlens substrate. As a result, there is no possibility that receives an adverse effect due to grinding or polishing particles that are inevitably caused in the manufacturing process of the conventional microlens substrate, and thus it is possible to increase the reliability of the manufactured microlens substrate. Further, by the provision of the coating layer constituted from the polysilazane reaction product, grinding and polishing steps of a glass substrate can be omitted, which is advantages in the viewpoints of increasing yielding percentage as well as saving natural resource and reducing environmental concerns.

The light transmittance of the coating layer 13 against light having a wavelength in the range of 400 to 800 nm is preferably 90% or higher, and more preferably 95% or higher. This makes it possible to project a brighter image when the microlens substrate 1 is used in a projection type display apparatus.

Further, the refraction factor of the coating layer 13 is preferably in the range of 1.40 to 1.50. This makes it possible for the microlens substrate 1 to have excellent optical characteristics.

Furthermore, the thickness of the coating layer 13 is preferably in the range of 0.1 to 5.0 μm, and more preferably in the range of 0.5 to 2.0 μm. When the thickness of the coating layer 13 lies within the above range, the optical characteristics and durability of the microlens substrate 1 can be made excellent.

The opposed substrate 10 for a liquid crystal panel includes: the microlens substrate 1 as described above; a black matrix 2 formed on the microlens substrate 1 and having a plurality of openings 21; and a transparent conductive film (common electrode) 3 formed so as to cover the black matrix 2 on the microlens substrate 1 (see FIG. 1).

The black matrix 2 having a light shielding function is provided so as to correspond to the position of each of the microlenses 121. More specifically, the black matrix 2 is provided so that an optical axis Q of each of the microlenses 121 passes through the corresponding opening 21 formed in the black matrix 2. Thus, incident light L entering the opposed substrate 10 for a liquid crystal panel from one major surface thereof which does not face the black matrix 2 is condensed by each of the microlenses 121 of the convex lens substrate 12, and passes through the corresponding opening 21 in the black matrix 2.

The black matrix 2 is formed of, for example, a metal film such as a Cr film, an Al film, an Al alloy film, a Ni film, a Zn film, or a Ti film or a resin layer in which carbon or titanium is dispersed. Although the constituent material thereof is not particularly limited, among these materials, it is preferable that the black matrix 2 is formed of a Cr film or an Al alloy film. In the case where the black matrix 2 is formed of the Cr film, it is possible to obtain a black matrix 2 having an excellent light blocking function. Further, in the case where the black matrix 2 is formed of the material as described above, it is possible to improve adhesion between the convex lens substrate 12 and the black matrix 2, in particular.

It is preferable that the thickness of the black matrix 2 is in the range of 0.1 to 1.0 μm, and more preferably it is in the range of 0.1 to 0.5 μm. In the case where the thickness of the black matrix 2 lies within the above ranges, it is possible to improve the surface smoothness of the opposed substrate 10 for a liquid crystal panel sufficiently, and it is also possible to improve the light blocking effect by the black matrix 2, in particular.

The transparent conductive film 3 is an electrode having transparency, and light can penetrate the transparent conductive film 3. For this reason, the amount of light of the incident light L is prevented from being attenuated seriously when the incident light L passes through the opposed substrate 10 for a liquid crystal panel. In other words, the opposed substrate 10 for a liquid crystal panel has high light transmittance.

As for a constituent material of the transparent conductive film 3, for example, indium tin oxide (ITO), indium oxide (IO), tin oxide ($SnO_2$) may be mentioned.

Further, although the thickness of the transparent conductive film 3 is not particularly limited, it is preferable that the thickness thereof is in the range of 0.1 to 1 µm, and more preferably it is in the range of 0.1 to 0.5 µm.

In the opposed substrate 10 for a liquid crystal panel as described above, one microlens 121 and the corresponding opening 12 in the black matrix 2 correspond to one pixel.

In this regard, the opposed substrate 10 for a liquid crystal panel may have any configuration other than that as described above. For example, an antireflection layer may be provided on the outer major surface side of the substrate 11 with concave portions. Further, an orientation film (alignment film) maybe provided on the outer major surface side of the transparent conductive film 3.

<Method of Manufacturing Microlens Substrate>

Next, a description will be given for preferred embodiments of the method of manufacturing the microlens substrate of the invention with reference to FIGS. 2 and 3. In this regard, it is to be noted that the method of manufacturing the microlens substrate is not limited thereto.

<<Manufacture of Substrate with Concave Portions>>

First, one example of a method of manufacturing the substrate with concave portions constituting a part of the microlens substrate according to the invention will be described with reference to the appending drawings.

A glass substrate 8 is first prepared. It is preferable that a substrate having a uniform thickness without flexure and having no defect is used for the glass substrate 8. Further, it is also preferable that a substrate with a surface cleaned by washing or the like is used for the glass substrate 8.

The glass substrate 8 is formed of a glass material as exemplified as the constituent material of the substrate 11 with concave portions described above.

<1> As shown in FIG. 2(*a*), a film 9' for forming a mask is formed on the surface of the prepared glass substrate 8. The film 9' for forming a mask functions as a mask by forming a plurality of openings (initial holes) therein at a subsequent process.

It is preferable that the film 9' for forming a mask permits initial holes 91 to be formed therein (will be described later) by means of irradiation with laser beams or the like, and has resistance to etching at an etching process (will be described later). In other words, it is preferable that the film 9' for forming a mask is constituted so that it has an etching rate nearly equal to or smaller than that of the glass substrate 8.

From such a viewpoint, for example, metals such as Cr, Au, Ni, Ti, Pt, and the like, alloys containing two or more kinds selected from these metals, oxides of these metals (metal oxides), silicon, resins, or the like may be mentioned as the material for the film 9' for forming a mask (that is, the mask 9). Alternatively, the mask 9 may be given a laminated structure by a plurality of layers formed of different materials such as a Cr/Au laminate or a chromium oxide/chromium laminate.

The method of forming the film 9' for forming a mask is not particularly limited. In the case where the film 9' for forming a mask is constituted from metal materials (including alloy) such as Cr and Au or metal oxides such as chromium oxide, the film 9' for forming a mask can be suitably formed by an evaporation method, a sputtering method, or the like, for example. On the other hand, in the case where the mask 9 is formed of silicon, the film 9' for forming a mask can be suitably formed by a sputtering method, a CVD method, or the like, for example.

Although the thickness of the film 9' for forming a mask (mask 9) also varies depending upon the constituent material of the film 9' for forming a mask, it is preferable that the thickness is in the range of 0.01 to 2.0 µm, and more preferably it is in the range of 0.03 to 0.2 µm. If the thickness is below the lower limits given above, there is a possibility that the shape of each of the initial holes 91 formed at an initial hole formation process is deformed. In addition, there is a possibility that sufficient protection for the masked portion on the glass substrate 8 cannot be obtained when subjecting the glass substrate 8 to a wet etching process at the etching process (will be described later). On the other hand, if the thickness exceeds the upper limits given above, in addition to the difficulty in formation of the initial holes 91 each passing through the glass substrate 8 at the initial hole formation process (will be described later), there will be a case in which the film 9' for forming a mask tends to be easily peeled off due to internal stress of the film 9' for forming a mask depending upon the constituent material or the like of the film 9' for forming a mask.

<2> Next, as shown in FIG. 2(*b*), the plurality of initial holes 91 that will be utilized as mask openings at the etching process (will be described later) are formed in the film 9' for forming a mask (initial hole formation process). Thus, a mask 9 having a predetermined opening pattern is obtained.

Although the initial holes 91 may be formed by any method, it is preferable that the initial holes 91 are formed by means of the physical method or the irradiation with laser beams. This makes it possible to manufacture the substrate with concave portions for forming a microlens substrate and the microlens substrate 1 with high productivity, for example. In particular, the concave portions can be easily formed on a relatively large-sized substrate with concave portions.

As for the physical method of forming the initial holes 91, for example, blast processing such as shot blast, sand blast or the like, etching, pressing, dot printing, tapping, rubbing, or the like may be mentioned. In the case where the initial holes 91 are formed by means of the blast processing, it is possible to form the initial holes 91 with high efficiency in a shorter time even for a glass substrate 8 with a relatively large area (that is, an area of the region for formation of microlenses 121).

Further, in the case where the initial holes 91 are formed by means of irradiation with laser beams, the kind of laser beams to be used is not particularly limited, but a ruby laser, a semiconductor laser, a YAG laser, a femtosecond laser, a glass laser, a $YVO_4$ laser, a Ne—He laser, an Ar laser, a carbon dioxide laser, an excimer laser or the like can be preferably used. Moreover, a wavelength of each of such lasers such as SHG, THG and FHG may be utilized. In the case where the initial holes 91 are formed by means of the irradiation of laser beams, it is possible to easily and precisely control the size of each of the initial holes 91, distance between adjacent initial holes 91, or the like.

<3> Next, as shown in FIG. 2(*c*), a large number of concave portions 111 are formed on the glass substrate 8 by subjecting the glass substrate 8 to the etching process using the mask 9 in which the initial holes 91 have been formed (etching process).

The etching method is not particularly limited, and a wet etching process, a dry etching process or the like may be mentioned as an example. In the following explanation, the case of using the wet etching process will be described as an example.

By subjecting the glass substrate 8 covered with the mask 9 in which the initial holes 91 are formed to the etching (wet etching process), as shown in. FIG. 2(d), the glass substrate 8 is eroded from the portions where no mask is present, namely, from the initial holes 91, whereby a large number of concave portions 111 are formed on the glass substrate 8. By using the wet etching process in this manner, it is possible to form the large number of concave portions 111 appropriately. In the case where an etchant containing hydrofluoric acid (hydrofluoric acid-based etchant) is utilized as an etchant, for example, the glass substrate 8 is eroded more selectively, and this makes it possible to form the concave portions 111 appropriately.

<4> Next, as shown in FIG. 2(e), the mask 9 is removed (mask removal process). The mask 9 can be removed by means of etching or the like.

As described above, as shown in FIG. 2(d), a substrate 101 with concave portions on which the large number of concave portions 111 are formed is obtained.

In this case, a back surface protective film formed of the same material as that of the film 9' for forming a mask may be provided on the other major surface (back surface) of the glass substrate 8 opposite to the major surface on which the plurality of concave portions 111 are formed when the film 9' for forming a mask is formed if needed. This makes it possible to maintain the thickness of the glass substrate 8 because the whole back surface of the glass substrate 8 is not subjected to an etching process.

<<Process for Supplying Composition>>

First, as shown in FIG. 3(a), a composition 122 having fluidity for forming the convex lens substrate 12 (that is, a convex lens substrate formation composition) is supplied onto the surface of the substrate 11 with concave portions on which the concave portions 111 are formed.

Although the viscosity of the composition 122 at room temperature (20° C.) is not particularly limited, it is preferable that the viscosity thereof is in the range of 10 to 10,000 mPa·s. In the case where the viscosity of the composition 122 lies within the above range, it is possible to form a convex lens substrate 12 having a relatively great thickness easily and surely, and therefore, it is possible to manufacture the microlens substrate 1 having excellent reliability easily and surely. In addition, for example, it is possible to effectively prevent air bubbles from intruding between the substrate 11 with concave portions and the convex lens substrate 12. Thus, it is possible to particularly improve adhesion between the substrate 11 with concave portions and the convex lens substrate 12. Therefore, the microlens substrate 1 can have excellent reliability and optical characteristics.

<<Degassing Process>>

Next, the composition 122 on the substrate 11 with concave portions is subjected to a degassing process. Thus, it is possible to effectively prevent ambient gas (air) from remaining between the surface of the substrate 11 with concave portions and the composition 122. As a result, it is possible to form microlenses 121 corresponding to the shapes of the concave portions 111 surely. Further, it is also possible to prevent air bubbles or the like from remaining in the composition 122, and as a result, it is possible to improve the optical characteristics of the microlens substrate 1.

Although the method of the degassing process is not particularly limited, for example, a method of placing the substrate 11 with concave portions to which the composition 122 has been supplied under reduced pressure may be mentioned. In the case of adopting such a method, it is preferable that the ambient pressure at which the substrate 11 with concave portions to which the composition 122 has been supplied is placed is 50 Pa or lower, and more preferably it is 5 Pa or lower.

<<Pressing Process>>

Next, as shown in FIG. 3(b), the composition 122 on the substrate 11 with concave portions is pressed with a flat plate (pressing member) 80. In particular, in the present embodiment, the composition 122 is pressed in a state that spacers 123 are provided between the substrate 11 with concave portions and the flat plate 80. Thus, it is possible to control the thickness of the convex lens substrate 12 to be formed more surely, and this makes it possible to efficiently prevent disadvantage such as Color Heterogeneity (uneven color distribution) from occurring when the microlens substrate 1 finally obtained is used.

The spacers 123 can be arranged, for example, at a region (non-effective region) other than an effective region of the substrate 11 (an effective region at which the microlenses 121 are to be formed) with concave portions at which the concave portions 111 are provided. By arranging the spacers 123 at the non-effective region of the substrate 11 with concave portions, for example, it is possible to arrange a large number of spacers 123 at a flat portion (that is, the non-effective region) in the case where the substrate 11 with concave portions has a plurality of regions each corresponding to one piece of microlens substrate 1 for a liquid crystal panel (that is, in the case where a plurality of collective patterns each corresponding to one piece of microlens substrate 1 for a liquid crystal panel are arranged on the substrate 11 with concave portions). As a result, it is possible to control the thickness of the obtained microlens substrate 1 more surely while efficiently preventing influence due to a bend or the like of the substrate 11 with concave portions or the flat plate 80.

Further, spacers 123 as follows may be used.

Each of the spacers 123 is formed of a material having an index of refraction nearly equal to that of the cured object of the composition 122. By using the spacers 123 formed of such a material, it is possible to prevent the spacers 123 from giving an adverse effect to the optical characteristics of the obtained microlens substrate 1 even in the case where the spacers 123 are arranged in portions in each of which the concave portion 111 of the substrate 11 with concave portions is formed. This makes it possible to provide a relatively large number of spacers 123 over substantially the whole effective region of one major surface of the substrate 11 with concave portions. As a result, it is possible to get rid of the influence due to flexure of the substrate 11 with concave portions and/or the flat plate 80, or the like efficiently, and this makes it possible to control the thickness of the obtained microlens substrate 1 more surely.

Although the spacers 123 are formed of the material having an index of refraction nearly equal to that of the cured object of the composition 122, more specifically, it is preferable that the absolute value of the difference between the absolute index of refraction of the constituent material of the spacers 123 and the absolute index of refraction of the cured composition 122 is 0.20 or less, more preferably it is 0.10 or less, further more preferably it is 0.02 or less, and most preferably the spacer 123 is formed of the same material as that of the cured object of the composition 122. This makes it possible to improve the optical characteristics of the microlens substrate 1. Moreover, in the case where the spacer 123 is formed of the same material as that of the cured object of the composition 122, it is possible to particularly improve adhesion between the cured object of the composition 122 and the spacers 123. This makes it possible to improve reliability and durability of the microlens substrate 1. Furthermore, in the case where the spacer 123 is formed of the same material as that of the cured object of the composition 122, it is possible to heighten the hardness of the spacer 123. Thus, it is possible to control the thickness of the convex lens substrate 12 to be formed more surely.

The shape of each of the spacers 123 is not particularly limited. It is preferable that the shape of each of the spacers 123 is a substantially spherical shape or a substantially cylindrical shape. In the case where each of the spacers 123 has such a shape, it is preferable that the diameter of each spacer 123 is in the range of 20 to 100 μm, and more preferably it is in the range of 20 to 50 μm.

In this regard, when the spacers 123 as described above are used, the spacers 123 may be provided between the substrate 11 with concave portions and the flat plate 80 when curing the composition 122. Thus, the timing to place the spacers 123 is not particularly limited. For example, the composition 122 may be supplied onto the surface of the substrate 11 with concave portions in a state that the spacers 123 are arranged on the substrate 11 with concave portions. Alternatively, the spacers 123 may be placed onto the surface of the substrate 11 with concave portions after supplying the composition 122 thereto.

Further, the flat plate 80 is a member having a flat surface for pressing the composition 122. Moreover, the flat surface of the flat plate 80 by which the composition 122 is pressed may be subjected to a mold releasing treatment. This makes it possible to remove the flat plate 80 from the surface of the convex lens substrate 12 at the following steps efficiently. As for the mold releasing treatment, for example, formation of a film using a fluorine based compound solution containing meta-xylylene hexafluoride as a main component; formation of a film formed of a material having mold release ability including a fluorine based resin such as polytetrafluoroethylene; surface treatment by means of silylate materials by silylating agent such as hexamethyldisilazane ($[(CH_3)_3Si]_2NH$), surface treatment by means of fluorine based gas or the like may be mentioned.

Moreover, this treatment may be carried out while carrying out the degassing process as described above. In other words, the pressing process and the degassing process may be carried out as one process. Thus, it is possible to prevent ambient gas (air) from remaining between the surface of the substrate 11 with concave portions and the composition 122 more efficiently, and as a result, it is possible to form the microlenses 121 each corresponding to the shape of each of the concave portions 111 more surely.

<<Curing Process>>

Next, the composition 122 is cured to form a convex lens substrate 12 provided with microlenses 121 (see FIG. 3(c)).

In the case where the composition 122 is formed of a thermoplastic resin, curing of the composition 122 is carried out by cooling it. Further, in the case where the composition 122 is formed of a thermosetting resin, curing of the composition 122 is carried out by heating it. Furthermore, in the case where the composition 122 is formed of a photo-curing resin, curing of the composition 122 is carried out by irradiating it with light.

Although in the case where this step is carried out by heating the composition 122, temperature at this process is not particularly limited, but it is preferable that the heating temperature is in the range of 100 to 200° C. Further, although processing time (heating time) at this process is also not particularly limited, it is preferable that the processing time is in the range of 30 to 120 minutes in the case of the heating temperature as described above.

<<Pressing Member Removing Process>>

Then, as shown in FIG. 3(d), the flat plate 80 as the pressing member is removed. Thus, the microlens substrate 1 constructed from the substrate 11 with concave portions and the convex lens substrate 12 is obtained.

<<Composition Supply Process (Coating Layer Formation Composition Supply Process)>>

First, as shown in FIG. 4(e), a composition 131 having fluidity and containing a polysilazane compound is applied onto the one major surface of the convex lens substrate 12 which does not face the substrate 11 with concave portions. This composition will be cured at the subsequent process to be formed into the polysilazane reaction product described above.

Namely, the feature of the invention resides in the use of the polysilazane compound as a constituent material for forming the coating layer 13. By using the polysilazane compound, it is possible to obtain a microlens substrate (that is, a microlens substrate having a coating layer formed of the polysilazane reaction product) having excellent properties as described above.

The polysilazane compound used in this invention is a polymer having a Si—N bond in each of the repeating structural units of the molecule. By using such a polysilazane compound, it is possible to obtain a microlens substrate (that is, a microlens substrate having a coating layer formed of the polysilazane reaction product) having excellent properties easily and reliably under relatively mild conditions.

Various polymers of the polysilazane compound can be used if they have a Si—N bond in each of the repeating structural units of the molecule, but a polymer of the polysilazane compound represented by the following chemical formula (I) is preferably used. By using such a polymer, optical characteristics and durability of the microlens substrate can be made excellent.

(I)

In this regard, it is to be noted that as the polysilazane compound, a compound obtained by substituting at least a part of hydrogen atoms directly bonded to Si in the compound represented by the above chemical formula (I) with organic groups (e.g. alkyl groups), that is, a compound as represented by the following chemical formula (II) may be used.

(II)

where each of R,R' independently represents an organic group such as an alkyl group.

The viscosity of the composition 131 at room temperature (20° C.) is not limited to any specific value, but it is preferable that the viscosity is in the range of 0.5 to 10 mPa·s. If the viscosity of the composition lies within the above range, it is possible to form a coating layer 13 having a relatively large thickness easily and reliably, and thus it is possible to manufacture a microlens substrate having excellent optical characteristics and reliability easily and reliably. Further, it is also possible to prevent air bubbles from intruding between the convex lens substrate 12 and the coating layer 13 effectively. As a result, adhesion between the convex lens substrate 12 and the coating layer 13 can be made excellent, and thus reliability and optical characteristics of the microlens substrate 1 can also be made excellent.

The composition 131 used in this process may contain other constituent components in addition to the polysilazane compound. For example, the composition 131 may contain as its constituent components a metal oxide such as titanium oxide, zirconium oxide, aluminum oxide, and the like, and a liquid medium such as a catalyst, a solvent and a dispersion medium which can contribute to a reaction in which the polysilazane compound is changed into the polysilazane reaction product, and the like. When the composition 131 contains a metal oxide, an index of refraction of the obtained coating layer 13 can be made higher, and thus optical characteristics of the microlens substrate 1 can be made more excellent. Further, when the composition 131 contains a catalyst, a curing process describe later can be carried out under milder conditions and this is preferable from the viewpoints of preventing deterioration of the constituent material of the microlens substrate 1 and improving productivity of the microlens substrate 1. As for such a catalyst, for example, a palladium based catalyst, an amine based catalyst, or the like can be used. Among these catalysts, an amine based catalyst is particularly preferred. By using the amine based catalyst, the curing process describe later can be carried out under especially mild conditions. Further, when the composition 131 contains a solvent, handlability of the composition 131 in this process becomes easy, and thus it is possible to form a coating layer 13 having a desired thickness more easily. As for such a solvent, toluene, xylene, and the like can be used, but dibutyl ether is preferable. The dibutyl ether exhibits excellent dissolbility against the polysilazane compound, while it has less dissolbility against the constituent material of the convex lens substrate 12 described above. Therefore, by using the dibutyl ether, it is possible to form a coating layer 13 having homogeneous properties easily and reliably while preventing deformation of the convex lens substrate 12 more reliably. Further, since the dibutyl ether is a substance which has relatively high safeness against human bodies or the like, use of the dibutyl ether is preferable from the viewpoint of health of users.

<<Degassing Process>>

Next, the composition 131 on the convex lens substrate 12 is subjected to a degassing process. By this degassing processing, it is possible to effectively prevent ambient gas (air) from remaining between the surface of the convex lens substrate 12 and the composition 131. As a result, it is possible to form a coating layer 13 on the surface of the convex lens substrate 12 reliably. Further, it is also possible to prevent reliably air bubbles or the like from remaining in the composition 131, that is, in the polysilazane reaction product (the coating layer 13) which is a cured material of the composition 131, and as a result, it is possible to improve the optical characteristics of the microlens substrate 1.

Although the method of the degassing process is not particularly limited, for example, a method of placing the convex lens substrate 12 (the convex lens substrate 12 joined with the substrate 11 with concave portions) on which the composition 131 has been applied under reduced pressure may be mentioned. In the case of adopting such a method, it is preferable that the ambient pressure at which the convex lens substrate 12 to which the composition 131 has been applied is placed is 50 Pa or lower, and more preferably it is 5 Pa or lower.

<<Curing Process>>

Next, the composition (polysilazane compound) 131 is cured to form the coating layer 13 (see FIG. 4(f)). In this way, it is possible to obtain a microlens substrate 1 composed from the substrate 11 with concave portions, the convex lens substrate 12 and the coating layer 13.

The curing of the composition 131 is normally carried out by heating it in an atmosphere containing moisture. According to this method, the reaction as described above can progress effectively, and thus it is possible to form a coating layer 13 formed of the polysilazane reaction product effectively. Further, by carrying out the curing in an atmosphere which contains oxygen in addition to the moisture, the reaction described above can progress more effectively, and thus it is possible to form the coating layer 13 formed from the polysilazane reaction product more effectively. Furthermore, by carrying out the curing of the composition by heating it, the sensitivity (reactivity) of the formed coating layer 13 against light can be made especially low, thereby enabling the microlens substrate 1 to have more excellent durability.

In this regard, it is to be noted that in the case where the compound as represented by the above-mentioned chemical formula (I) is used as the polysilazane compound, it is supposed that the following reactions progress. Namely, in the case where the curing of the composition 131 is carried out under the condition containing moisture, it is supposed that the reaction represented by the following chemical formula (III) progresses, and in the case where the curing of the composition 131 is carried out under the condition containing oxygen, it is supposed that the reaction represented by the following chemical formula (IV) progresses.

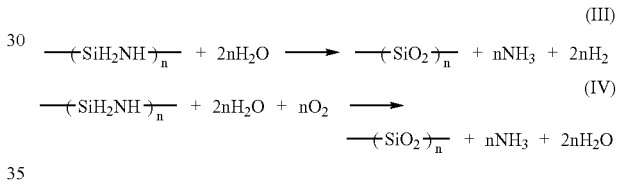

(III)
(IV)

The heating temperature in this process is not particularly limited, but it is preferably in the range of 50 to 500° C., and more preferably in the range of 50 to 250° C.

Further, the treatment time (heating time) in this process is also not limited to any specific time, but in the case where the heating temperature lies within the above range, it is preferably in the range of 0.5 to 10 hours, and more preferably in the range of 0.5 to 1.5 hours.

<Method of Manufacturing Opposed Substrate for Liquid Crystal Panel>

Next, a method of manufacturing an opposed substrate 10 for a liquid crystal panel provided with the microlens substrate 1 as described above will now be described.

Figure 5:
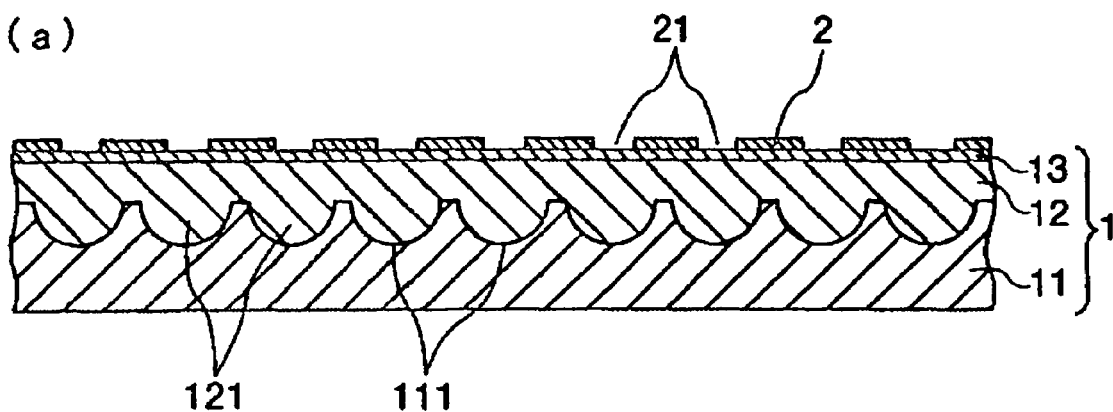
FIG. 5 is a schematic longitudinal cross-sectional view which shows a method of manufacturing an opposed substrate for a liquid crystal panel of the invention.
Figure 5:
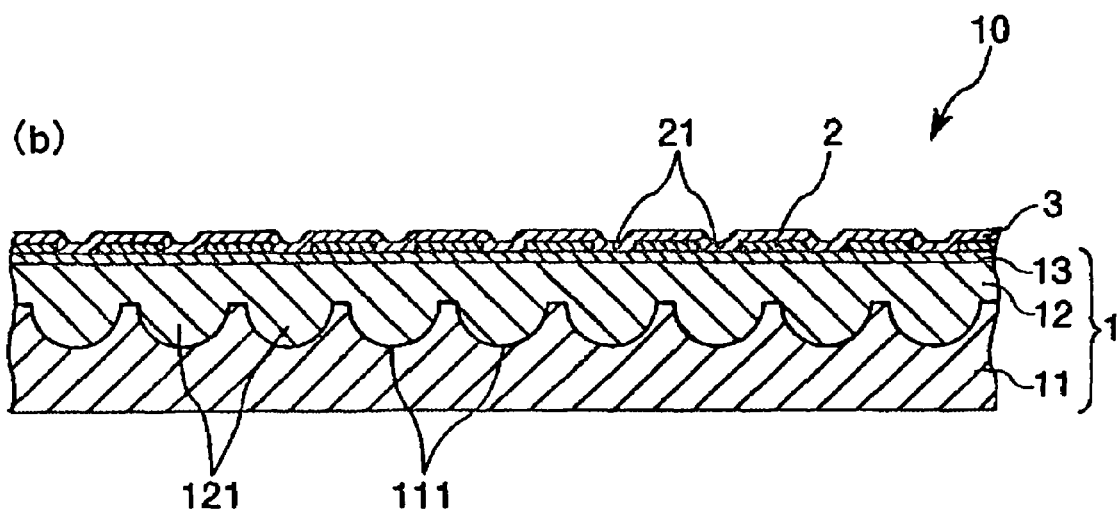

<1> As shown in FIG. 5(a), a black matrix 2 in which to cover the black matrix 2 therewith (see FIG. 5(b)). In this case, the transparent conductive film 3 can be formed on the convex lens substrate 102 by means of a vapor film formation method such as a sputtering method.

Then, as needed, the wafer is cut into one or more opposed substrate 10 for a liquid crystal panel having a predetermined shape and size using a dicing apparatus or the like.

In the manner as described above, the opposed substrate 10 for a liquid crystal panel as shown in FIG. 1 can be obtained.

In this regard, in the case where the opposed substrate 10 for a liquid crystal panel is obtained after the process <2> described above, that is, in the case where the cutting process is not required, this cutting process may not be carried out.

In the method of manufacturing the opposed substrate 10 for a liquid crystal panel, the transparent conductive film 3 may be directly formed on the convex lens substrate 12, for example, without forming the black matrix 2.

<Liquid Crystal Panel>

Next, a liquid crystal panel (liquid crystal light shutter) in which the microlens substrate 1 and the opposed substrate 10 for a liquid crystal panel as shown in FIG. 1 are used will be described with reference to FIG. 6.

Figure 6:
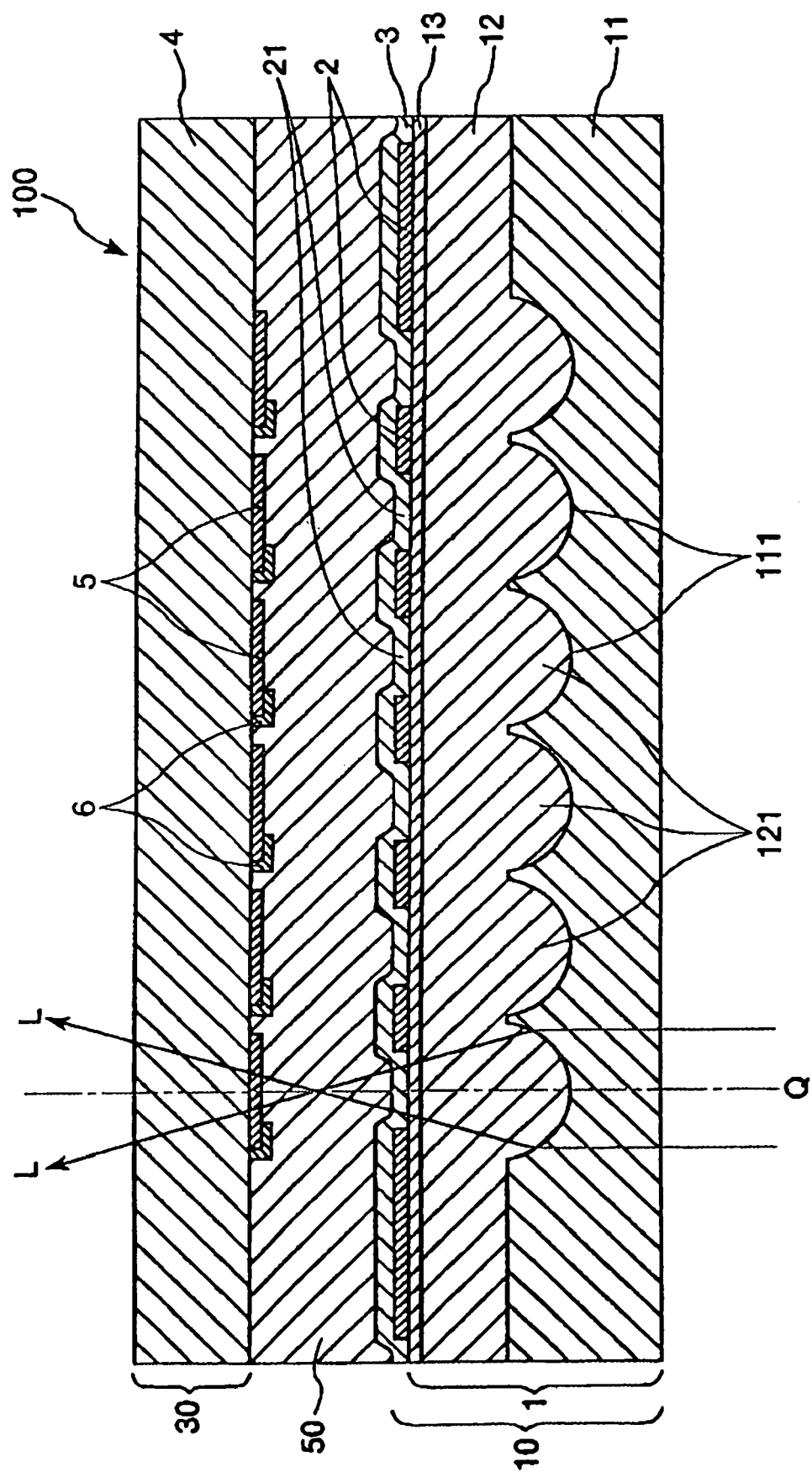
FIG. 6 is a schematic longitudinal cross-sectional view which shows a liquid crystal panel of the invention.

As shown in FIG. 6, the liquid crystal panel (TFT liquid crystal panel) 100 of the invention is provided with: a TFT substrate (liquid crystal driving substrate) 30; an opposed substrate 10 for a liquid crystal panel which is joined to the TFT substrate 30; a liquid crystal layer 50 consisting of liquid crystal filled or enclosed in a gap between the TFT substrate 30 and the opposed substrate 10 for a liquid crystal a plurality of openings 21 are formed is formed on the convex lens substrate 12 of the microlens substrate 1 obtained as described above. In this case, the black matrix 2 is formed so that the plurality of openings 21 respectively correspond to the microlenses 121, more specifically, so that an optical axis Q of each of the microlenses 121 passes through the corresponding opening 21 formed in the black matrix 2 (see FIG. 1).

For example, it is possible to form the black matrix 2 in which the plurality of openings 21 are formed on the microlens substrate 1 (that is, convex lens substrate 12) as follows.

A thin film to be the black matrix 2 is first formed on the convex lens substrate 12 by means of a vapor film formation method such as a spattering method. Next, a resist film is formed on the thin film to be the black matrix 2. The resist film is subjected to exposure so that each of the plurality of openings 21 in the black matrix 2 is formed at the position of the corresponding microlens 121 (or the concave portion 111), whereby a pattern for the openings 21 is formed in the resist film. Next, the convex lens substrate 12 with the resist film is subjected to a wet etching process, whereby only portions that become the openings 21 are removed from the thin film. The resist film is then removed. In this regard, in the case where the thin film to be the black matrix 2 is formed of an Al alloy, it is possible to use a phosphate system etchant as a releasing liquid for the wet etching process. Alternatively, the black matrix 2 in which the openings 21 are formed may be formed by means of a dry etching process using a chloride system gas appropriately.

<2> Next, a transparent conductive film (common electrode) 3 is formed on the convex lens substrate 12 so as panel.

The TFT substrate 30 is a substrate for driving liquid crystal of the liquid crystal layer 50 and includes a glass substrate 4, plural (a large number of) pixel electrodes 5 provided on the glass substrate 4, and plural (a large number of) thin film transistors (TFT) 6 provided in the vicinity of the respective pixel electrodes 5 and corresponding to the respective pixel electrodes 5.

In the liquid crystal panel 100, the TFT substrate 30 is joined to the opposed substrate 10 for a liquid crystal panel in a manner to be spaced with a constant interval so that the transparent conductive film (common electrode) 3 of the opposed substrate 10 for a liquid crystal panel faces the large number of pixel electrodes 5 of the TFT substrate 30.

It is preferable that the glass substrate 4 is formed of quartz glass. This makes it possible to obtain a liquid crystal panel (TFT substrate) that is less likely to be warped or bent and has excellent stability.

The pixel electrodes 5 perform charging and discharging between the transparent conductive film (the common electrode) 3 and the pixel electrodes 5 to thereby drive the liquid crystal of the liquid crystal layer 50. The pixel electrodes 5 are formed of, for example, a material same as the material of the transparent conductive film 3.

The thin film transistors 6 are connected to the pixel electrodes 5 corresponding to and provided near the thin film transistors 6. The thin film transistors 6 are connected to a control circuit (not shown in the drawings) and controls an electric current supplied to the pixel electrodes 5. As a result, charging and discharging of the pixel electrodes 5 are controlled. In this regard, for example, an orientation film may be provided on the inner major surface side (the surface side which faces the liquid crystal layer 50) of the TFT substrate 30.

The liquid crystal layer 50 contains liquid crystal molecules (not shown in the drawings). Orientation of the liquid crystal molecules, that is, liquid crystal, changes in response to charging and discharging of the pixel electrodes 5.

In such a liquid crystal panel 100, usually, one microlens 121, one opening 21 of the black matrix 2 corresponding to an optical axis Q of the microlens 121, one pixel electrode 5, and one thin film transistor 6 connected to the pixel electrode 5 correspond to one pixel.

Incident light L entering from the side of the substrate 11 with concave portions passes through the glass substrate 8 and permeates through the convex lens substrate 12, the openings 21 of the black matrix 2, the transparent conductive film 3, the liquid crystal layer 50, the pixel electrodes 5, and the glass substrate 4 while being condensed when the incident light L passes through the microlenses 121. At this point, since a polarizing plate (not shown in the drawings) is usually provided on the incidence side of the substrate 11 with concave portions, the incident light L changes to linear polarized light when the incident light L is transmitted through the liquid crystal layer 50. In that case, a polarizing direction of the incident light L is controlled in association with an orientation state of the liquid crystal molecules of the liquid crystal layer 50. Therefore, it is possible to control luminance of emitted light by transmitting the incident light L, which is transmitted through the liquid crystal panel 100, through the polarizing plate (not shown in the drawings).

In this regard, the polarizing plate is constituted from, for example, a base substrate and a polarizing base material substrate laminated on the base substrate. The polarizing base material substrate is formed of a resin material in which a polarizing element (such as iodine complex, dichromatic dye) is added.

It is possible to manufacture the liquid crystal panel 100 by subjecting the TFT substrate 30 and the opposed substrate 10 for a liquid crystal panel, which are respectively manufactured by any known method, to an orientation process (for example, a process for coating an orientation film), and then, joining the TFT substrate 30 to the opposed substrate 10 for liquid crystal panel via a seal material (not shown in the drawings), injecting liquid crystal into a gap portion formed by the joining of the TFT substrate 30 and the opposed substrate 10 for liquid crystal panel from filling holes (not shown in the drawings) of the gap portion, and then closing the filling holes. A polarizing plate may then be applied to either the incident side or the emission side of the liquid crystal panel 100, if needed.

In this case, in the liquid crystal panel 100, the TFT substrate is used as the liquid crystal driving substrate. However, a liquid crystal driving substrate other than the TFT substrate such as a TFD substrate, an STN substrate and the like may be used for the liquid crystal driving substrate.

<Projection Type Display Apparatus>

Hereinafter, a projection type display apparatus using the liquid crystal panel 16 will now be described.

Figure 7:
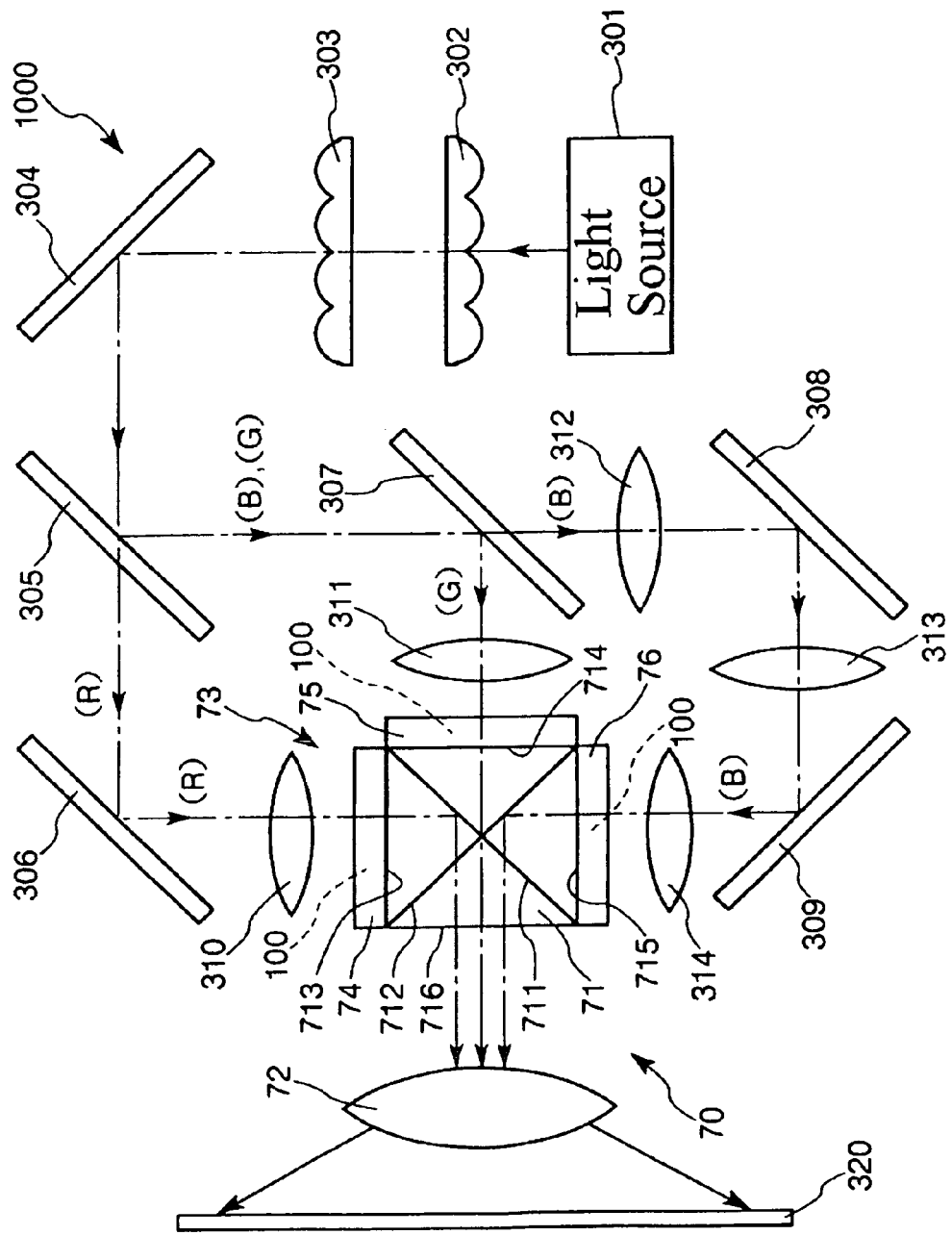
FIG. 7 is a schematic view which shows an optical system in a projection type display apparatus of the invention.

FIG. 7 is a schematic view which shows an optical system in a projection type display apparatus of the invention.

As shown in FIG. 7, a projection type display apparatus 1000 includes: a light source 301; a lighting optical system provided with a plurality of integrator lenses; a color separation optical system (a light guiding optical system) provided with a plurality of dichroic mirrors and the like; a liquid crystal light valve (a liquid crystal light shutter array) (for red) 74 corresponding to a red color; a liquid crystal light valve (a liquid crystal light shutter array) (for green) 75 corresponding to a green color; a liquid crystal light valve (a liquid crystal light shutter array) (for blue) 76 corresponding to a blue color; a dichroic prism (a color combining optical system) 71 on which a dichroic mirror surface 711 for reflecting only red light and a dichroic mirror surface 712 for reflecting only blue light are formed; and a projection lens (a projection optical system) 72.

The lighting optical system includes integrator lenses 302 and 303. The color separating optical system includes mirrors 304, 306, and 309, a dichroic mirror 305 that reflects blue light and green light (transmits only red light), a dichroic mirror 307 that reflects only green light, a dichroic mirror 308 that reflects only blue light (or a mirror that reflects blue light), and condensing lenses 310, 311, 312, 313, and 314.

The liquid crystal light valve 75 includes: the liquid crystal panel 100 as described above; a first polarizing plate (not shown in the drawings) joined to the incident surface side of the liquid crystal panel 100 (the side of the liquid crystal panel 100 at which the substrate 11 with concave portions is positioned, that is, the side thereof opposite to the dichroic prism 71); and a second polarizing plate (not shown in the drawings) joined to the emission surface side the liquid crystal panel 100 (the side of the liquid crystal panel 100 which faces the substrate 11 with concave portions, that is, the side of the dichroic prism 71). The liquid crystal light valves 74 and 76 have the same structure as the liquid crystal light valve 75. The liquid crystal panels 100 included in the liquid crystal light valves 74, 75 and 76 are respectively connected to a driving circuit (not shown in the drawings).

In the projection type display apparatus 1000, the dichroic prism 71 and the projection lens 72 constitute an optical block 70. Further, the optical block 70 and the liquid crystal light valves 74, 75 and 76 fixedly provided on the dichroic prism 71 constitute a display unit 73.

Hereinafter, operations of the projection type display apparatus 300 will be explained.

White light (white light beams) emitted from the light source 301 is transmitted through the integrator lenses 302 and 303. Light intensity (luminance distribution) of this white light is uniformalized by the integrator lenses 302 and 302.

The white light transmitted through the integrator lenses 302 and 303 is reflected to the left side in FIG. 7 by the mirror 304. Blue light (B) and green light (G) in the reflected light are reflected to the lower side in FIG. 6 by the dichroic mirror 305 and red light (R) in the reflected light is transmitted through the dichroic mirror 305.

The red light transmitted through the dichroic mirror 305 is reflected to the lower side in FIG. 7 by the mirror 306. The reflected light is shaped by the condensing lens 310 to be made incident on the liquid crystal light valve for red 74.

The green light in both the blue light and the green light reflected by the dichroic mirror 305 is reflected to the left side in FIG. 7 by the dichroic mirror 307, while the blue light is transmitted through the dichroic mirror 307.

The green light reflected by the dichroic mirror 307 is shaped by the condensing lens 311 and made incident on the liquid crystal light valve for green 75.

The blue light transmitted through the dichroic mirror 307 is reflected to the left side in FIG. 6 by the dichroic mirror (or the mirror) 308. The reflected light is further reflected to the upper side in FIG. 6 by the mirror 309. The blue light is shaped by the condensing lenses 312, 313, and 314 and made incident on the liquid crystal light valve for blue 76.

In this way, the white light emitted from the light source 301 is separated into three primary colors of red, green, and blue, guided to the liquid crystal light valves 74, 75, 76 corresponding thereto, respectively, and made incident thereon.

In this case, respective pixels (the thin film transistors 6 and the pixel electrodes 5 connected thereto) of the liquid crystal panel 100 included in the liquid light valve 74 are subjected to switching control (ON/OFF), that is, modulated by a driving circuit (a driving unit) that operates on the basis of an image signal for red.

Similarly, the green light and the blue light are made incident on the liquid crystal light valves 75 and 76, respectively, and modulated by the respective liquid crystal panels 100. Consequently, an image for green and an image for blue are formed. In this case, respective pixels of the liquid crystal panel 100 included in the liquid crystal light valve 75 are subjected to switching control by a driving circuit that operates on the basis of an image signal for green. Further, respective pixels of the liquid crystal panel 100 included in the liquid crystal light valve 76 are also subjected to switching control by a driving circuit that operates on the basis of an image signal for blue.

Consequently, the red light, the green light, and the blue light are modulated by the liquid crystal light valves 74, 75, and 76, respectively, and then, an image for red, an image for green, and an image for blue are formed.

The image for red formed by the liquid crystal light valve 74, that is, the red light from the liquid crystal light valve 74 is made incident on the dichroic prism 71 from a surface 713, reflected to the left side in FIG. 7 on the dichroic mirror surface 711, transmitted through the dichroic mirror surface 712, and then emitted from an emission surface 716.

Further, the image for green formed by the liquid crystal light valve 75, that is, the green light from the liquid crystal light valve 75 is made incident on the dichroic prism 71 from a surface 714, transmitted through the dichroic mirror surfaces 711 and 712, and then emitted from the emission surface 716.

Moreover, the image for blue formed by the liquid crystal light valve 76, that is, the blue light from the liquid crystal light valve 76 is made incident on the dichroic prism 71 from a surface 715, reflected to the left side in FIG. 7 on the dichroic mirror surface 712, transmitted through the dichroic mirror surface 711, and then emitted from the emission surface 716.

In this way, the lights of the respective colors from the liquid crystal light valves 74, 75, and 76, that is, the respective images formed by the liquid crystal light valves 74, 75 and 76 are combined by the dichroic prism 71. Consequently, a color image is formed. This image is projected (magnified and projected) on the screen 320 set in a predetermined position by the projection lens 72.

At this time, since the liquid crystal light valves 74, 75 and 76 are respectively provided with the liquid crystal panels 100, attenuation of the light from the light source 301 is prevented when passing through the liquid crystal light valves 74, 75 and 76, and therefore, it is possible to project a bright image on the screen 320.

As described above, it should be noted that, even though the microlens substrate 1, the liquid crystal panel 100 and the projection type display apparatus 1000 according to the invention have been described with reference to the preferred embodiments shown in the accompanying drawings, the invention is not limited to these embodiments.

For example, the microlens substrate 1 and the liquid crystal panel 1000 according to the invention are not limited to those manufactured by the methods as described above. Further, the substrate 11 with concave portions constituting the microlens substrate 1 of the invention may be manufactured using any method. For example, the substrate 11 with concave portions may be manufactured using a mold provided with a plurality of convex portions.

Moreover, in the embodiment as described above, even though the method in which the etching process is carried out using the mask has been described, an etching process may be carried out without a mask.

EXAMPLE

Example 1

A substrate with concave portions provided with a plurality of concave portions was manufactured, and then a microlens substrate was manufactured using the substrate with concave portions in the following manner.

<Formation Process for Substrate with Concave Portions>

First, a quartz glass substrate (which has an index of refraction of 1.46) having a thickness of 2 mm was prepared as a glass substrate.

The quartz glass substrate was soaked in a cleaning liquid (that is, a mixture of 80 vol % sulfuric acid solution and 20 vol % hydrogen peroxide solution) heated to 85° C. to be washed, thereby cleaning its surface.

Next, Cr films each having a thickness of 0.03 μm were formed on the quartz glass substrate by means of a spattering method. Namely, a film for forming a mask and a rear face protective film formed of the Cr films were formed on the both major surfaces of the quartz glass substrate.

Next, a laser machining was carried out with respect to the film for forming a mask, whereby a large number of initial holes were formed in the mask to form a mask (see FIG. 2(b)).

In this regard, the laser machining was carried out using a YAG laser under the conditions of energy intensity of 1 mW, a beam diameter of 3 μm, and an irradiation time of $60 \times 10^{-9}$ seconds. The average diameter of each of the formed initial holes was 5 μm.

Next, a large number of concave portions were formed on the quartz glass substrate by subjecting the quartz glass substrate to a wet etching process (see FIG. 2(d)).

An etching time for this wet etching process was set to 72 minutes, and a hydrofluoric-based etching liquid was used as an etchant.

Next, the mask and the rear face protective film were removed by subjecting the quartz glass substrate to a dry etching process using CF gas.

In this way, a substrate with concave portions in which a large number of concave portions were regularly formed on the quartz glass substrate was obtained. In this regard, the average diameter of each of the formed concave portions was 15 μm, and a radius of curvature thereof was 7.5 μm. Further, an interval between two adjacent concave portions for microlenses (average distance between the centers of two adjacent concave portions) was 15 μm.

<Process for Supplying Composition for Forming Convex Lens Substrate>

Next, a composition (composition for forming convex lens substrate) having fluidity is supplied onto the major surface of the substrate with concave portions manufactured as described above on which the concave portions are formed. As the composition, one constituted of an epoxy resin was used. The viscosity of the composition at room temperature (20° C.) was 1 Pa·s.

Further, at this time, in addition to the composition, spacers mainly formed of an epoxy resin (which has the same composition as the epoxy resin used as the cured object of the composition described above) are supplied onto the substrate with concave portions. Each of the spacers used was formed into a substantially spherical shape having 30 μm in diameter.

<Degassing Process>

Next, by placing the substrate with concave portions onto which the composition was supplied under reduced pressure, a degassing process was carried out. The ambient pressure during the degassing process was 5 Pa.

<Pressing Process>

Next, the composition on the substrate with concave portions was pressed with a flat plate (pressing member) under reduced pressure (ambient pressure was 5 Pa). The flat plate as follows was used. Namely, the flat plate was formed of a plate glass, and the surface thereof to press the composition was flat, and was subjected to a mold release process (that is, surface treatment in which a fluorine based compound solution containing meta-xylylene hexafluoride as a main component) was used.

<Curing Process>

Then, by subjecting the composition on the substrate with concave portions to a heating process at 100° C. for 60 minutes while pressing it with the flat plate, the composition was cured to form a convex lens substrate provided with a large number of microlenses. The convex lens substrate formed in this manner adhered tightly to the substrate with concave portions, and therefore, a gap was not confirmed between the convex lens substrate and the substrate with concave portions. Further, presence of air bubbles or the like was not confirmed in the formed convex lens substrate.

<Pressing Member Removing Process>

Then, by removing the pressing member, a microlens substrate constructed from the substrate with concave portions and the convex lens substrate was obtained. An index of refraction of a constituent material of the convex lens substrate was 1.59. Further, light transmittance of light having a wavelength in the range of 400 to 800 nm with respect to the convex lens substrate constituting the microlens substrate was 95%.

<Composition Supply Process (Coating Layer Formation Composition Supply Process)>

Next, as described above, a composition (composition for forming a coating layer) containing the polysilazane compound and having fluidity was supplied onto the other major surface of the convex lens substrate that does not face with the substrate with concave portion. The composition was mainly constituted of the polysilazane compound represented by the following chemical formula (I), and also contained a solvent made of dibutyl ether and an amine based catalyst. The viscosity of the composition at room temperature (20° C.) was 2 mPa·s.

<Degassing Process>

Next, by placing the substrate with concave portions joined with the convex lens substrate onto which the composition was supplied under reduced pressure, a degassing process was carried out. The ambient pressure during the degassing process was 5 Pa.

<Curing Process>

Then, by subjecting the composition on the substrate with concave portions to a heating process at 100° C. for 60 minutes, the composition was cured to form a coating layer constituted of the polysilazane reaction product to thereby obtain a microlens composed from the substrate with concave portions, the convex lens substrate, and the coating layer. The coating layer formed in this manner adhered tightly to the convex lens substrate, and therefore, a gap was not confirmed between the coating layer and the convex lens substrate. Further, presence of air bubbles or the like was not confirmed in the formed coating layer.

Further, an index of refraction of the constituent material of the coating layer 13 was 1.46. Furthermore, light remittance of light having a wave length of 400 to 800 nm of the coating layer constituting the microlens substrate was 93%. Moreover, the pencil hardness of the constituent material of the coating layer was 7H. Moreover, water absorption of the constituent material of the coating layer 13 was 0.1 vol % or less.

Total 100 pieces of microlens substrates were manufactured using the method as described above.

Example 2

Microlens substrates (total 100 pieces) were manufactured in the same manner as in the Example 1 described above except that as a composition for forming the convex lens substrate, a composition mainly constituted of an organic-inorganic composite material (epoxy resin-silica composite material) was used. In this Example 2, an index of refraction of the constituent material of the convex lens substrate was 1.57. Further, an amount of silica contained in the epoxy resin-silica composite material was 35 wt %, and an amount of the epoxy resin contained in the epoxy resin-silica composite material was 65 wt %.

Examples 3 and 4

In each of the Examples 3 and 4, microlens substrates (total 100 pieces) were manufactured in the same manner as in the Example 1 described above except that initial hole formation condition and etching condition against the a mask formation film when manufacturing the substrate with concave portions as well as composition of the coating layer formation composition and the amount of the supply of the composition were changed so that the composition, properties and thickness of the convex lens substrate were changed.

Comparative Example 1

A microlens substrate was manufactured using a substrate with concave portions obtained in the same manner as that in the Example 1 described above as follows. A non-polymerized (uncured) ultraviolet (UV) cured type epoxy resin material (which has an index of refraction of 1.59) was supplied onto the major surface of the substrate with concave portions on which the concave portions were formed.

Next, the UV cured type epoxy resin material was pressed with a glass substrate (thickness: 1 mm) formed of quartz glass. At this time, this process was carried out so that air was not intruded between the glass substrate and the UV cured type epoxy resin material.

Next, by irradiating ultraviolet rays of 10,000 mJ/cm$^2$ to the UV cured type epoxy resin material through the glass substrate, the UV cured type epoxy resin material was cured to join the glass substrate to the substrate with concave portions.

Next, by grinding and polishing the joined glass substrate, a cover glass having the thickness of 50 μm was formed.

The polished surface of the cover glass was then washed with brush cleaning using a scrub cleaning apparatus.

In this way, a microlens substrate was obtained.

Total 100 pieces of microlens substrates were manufactured using the method as described above.

Comparative Example 2

Microlens substrates (total 100 pieces) were manufactured in the same manner as in the Comparative Example 1 described above except that the flat plate (pressing member) used in the Example 1 was used in place of the glass substrate, the UV cured type epoxy resin material was pressed with the flat plate, and no cover glass was provided on the surface of the convex lens substrate.

The various conditions with respect to the microlens substrate of each of the Examples 1 to 4 and Comparative Examples 1 and 2 were shown in TABLE 1 as a whole.

<Evaluation>

TABLE 1

| | Microlens substrate | | | | | | | | |
|---|---|---|---|---|---|---|---|---|---|
| | Substrate with concave portions Concave portion | | | Convex lens substrate | | | | | Transmittance of light having wavelength of 400 to 800 nm [%] |
| | | | | Constituent material | | Microlens | | | |
| | Diameter [μm] | Radius of curvature [μm] | Depth [μm] | | Index of refraction | Diameter [μm] | Radius of curvature [μm] | Height [μm] | |
| EX. 1 | 15 | 7.5 | 10 | Thermosetting epoxy resin | 1.59 | 15 | 7.5 | 10 | 95 |
| EX. 2 | 15 | 7.5 | 10 | Epoxy-silica composite material | 1.57 | 15 | 7.5 | 10 | 95 |
| EX. 3 | 15 | 7.5 | 10 | Thermosetting epoxy resin | 1.59 | 15 | 7.5 | 10 | 90 |

TABLE 1-continued

| | | | | | | | | | |
|---|---|---|---|---|---|---|---|---|---|
| EX. 4 | 20 | 10 | 10 | Thermosetting epoxy resin | 1.57 | 20 | 10 | 10 | 90 |
| Com. Ex. 1 | 15 | 7.5 | 10 | UV cured type epoxy resin | 1.59 | 15 | 7.5 | 10 | 93 |
| Com. Ex. 2 | 15 | 7.5 | 10 | UV cured type epoxy resin | 1.59 | 15 | 7.5 | 10 | 93 |

| | Microlens substrate | | | | | |
|---|---|---|---|---|---|---|
| | Coating Layer | | | | | Composition for forming coating layer Viscosity at room temperature [mPa · s] |
| | Constituent material | Pencil hardness | Index of refraction | Thickness [μm] | Transmittance of light having wavelength of 400 to 800 nm [%] | Cover glass |
| EX. 1 | Polysilazane reaction product | 7H | 1.46 | 1.0 | 93 | No | 2 |
| EX. 2 | Polysilazane reaction product | 7H | 1.46 | 1.0 | 93 | No | 2 |
| EX. 3 | Polysilazane reaction product | 3H | 1.46 | 0.1 | 93 | No | 2 |
| EX. 4 | Polysilazane reaction product | 3H | 1.46 | 0.05 | 93 | No | 2 |
| Com. Ex. 1 | — | — | — | — | — | Yes | — |
| Com. Ex. 2 | — | — | — | — | — | No | — |

In each of the Examples 1 to 4 described above, it was possible to manufacture a microlens substrate easily as compared to the Comparative Example 1.

Further, in each of the Examples 1 to 4 described above, it was possible to manufacture a microlens substrate having stable quality with high productivity. On the other hand, in the Comparative Example 1, incidence of inferior goods became extremely high, and therefore, yielding ratio was low.

An opposed substrate for a liquid crystal panel as shown in FIG. 1 was then manufactured using the microlens substrate obtained in each of the Examples 1 to 4 and the Comparative Examples 1 and 2. Each opposed substrate for a liquid crystal panel was manufactured by forming a black matrix, a transparent conductive film and an orientation film on the microlens substrate in this order. The black matrix was formed by processes including formation of a film by means of a vapor deposition method, formation of a resist pattern by means of a photolithography method, formation of openings in a thin film by means of a wet etching method, and removal of the resist. Further, the transparent conductive film was formed by a vapor deposition method. Moreover, the orientation film was formed by a vapor deposition method (an oblique deposition method).

Next, a liquid crystal panel as shown in FIG. 6 was manufactured using the opposed substrate for a liquid crystal panel, and a projection type display apparatus as shown in FIG. 7 was then manufactured using the liquid crystal panel.

<<Evaluation of Image Quality>>

A sample pattern was displayed on a screen using the projection type display apparatus thus obtained in each of the Examples 1 to 4 and the Comparative Example 1 and 2. The following items were evaluated with respect to the displayed image.

(Brightness)

Brightness of the displayed image of the projection type display apparatus thus obtained in each of the Examples 1 to 4 and the Comparative Examples 1 and 2 was evaluated on the basis of the following four-step standard.

A: The extremely bright image could be displayed.

B: The sufficient bright image could be displayed.

C: The displayed image was somewhat inferior in brightness.

D: The displayed image was inferior in brightness.

(Color Heterogeneity)

The generation status of color heterogeneity in the projection type display apparatus thus obtained in each of the Examples 1 to 4 and the Comparative Examples 1 and 2 was evaluated on the basis of the following four-step standard.

A: No color heterogeneity was recognized.

B: Almost no color heterogeneity was recognized.

C: Color heterogeneity was slightly recognized.

D: Color heterogeneity was remarkably recognized.

(Color Definition)

The color definition in the projection type display apparatus thus obtained in each of the Examples 1 to 4 and the Comparative Examples 1 and 2 was evaluated on the basis of the following four-step standard.

A: The extremely definite image could be displayed.

B: The sufficient definite image could be displayed.

C: The displayed image was somewhat inferior in color definition.

D: The displayed image was inferior in color definition.

<Evaluation of Durability>

Each of the projection type display apparatuses was continuously driven for 5,000 hours. A projected image after the driving was observed for 5,000 hours and the same items described above were evaluated on the basis of the same standards.

These results were shown in TABLE 2 as a whole.

TABLE 2

| | Evaluation of Image Quality (at the initial stage of displaying image) | | | Valuation of Durability | | |
|---|---|---|---|---|---|---|
| | Brightness (Brilliance) | Color Heterogeneity | Color Definition | Brightness (Brilliance) | Color Heterogeneity | Color Definition |
| EX. 1 | A | A | B | A | A | B |
| EX. 2 | A | A | A | A | A | A |
| EX. 3 | A | A | B | A | B | B |
| EX. 4 | A | A | B | B | B | B |
| Com. Ex. 1 | B | C | C | B | C | D |
| Com. Ex. 2 | C | D | D | D | D | D |

As it is evident from TABLE 2, each of the projection type display apparatuses of the invention could display an image having excellent image quality. Further, each of the microlens substrate, the liquid crystal panel and the projection type display apparatus of the invention had excellent durability, and therefore, the projection type display apparatus could display the excellent image stably after driving it for a long time.

On the other hand, in each of the Comparative Examples 1 and 2, a sufficient result was not obtained. In particular, in the Comparative Example 2 in which no cover glass was provided, the image quality of the displayed image was extremely deteriorated from the initial stage. It was supposed that this was because of the following reasons. Namely, it was supposed that, in the manufacturing process of the opposed substrate for a liquid crystal panel, the constituent material of the convex lens substrate in the microlens substrate was deteriorated due to heat during the vapor deposition method (that is, at the time of formation of the black matrix, the transparent conductive film, and the orientated film) and/or the convex lens substrate was remarkably deformed at the time of construction of the liquid crystal panel. Further, in the Comparative Example 1 in which the convex lens substrate was covered with the cover glass which was obtained by polishing the glass substrate, the color definition of the displayed image was deteriorated from the initial stage. It was supposed that this was because particles due to the polish of the glass substrate remained in spite of sufficient cleaning. Moreover, the microlens substrate, the liquid crystal panel and the projection type display apparatus in each of the Comparative Examples 1 and 2 were inferior in durability.

What is claimed is:

1. A microlens substrate for use in an opposed substrate for a liquid crystal panel, comprising:
    a substrate with concave portions having a plurality of concave portions on one of the major surfaces thereof;
    a convex lens substrate having convex lenses on one of the major surfaces thereof, each of the convex lenses having a shape corresponding to each of the concave portions of the substrate with concave portions, and the convex lens substrate being provided with respect to the substrate with concave portions so that the convex lenses are opposed to the corresponding concave portions, respectively; and
    a coating layer provided on the other major surface of the convex lens substrate, the coating layer being mainly constituted of a product material produced by a reaction of a polysilazane compound with water.

2. The microlens substrate as claimed in claim 1, wherein the polysilazane compound is represented by the following formula (I):

3. The microlens substrate as claimed in claim 1, wherein the pencil hardness of the constituent material of the coating layer is 5H or higher.

4. The microlems substrate as claimed in claim 1, wherein the coating layer is formed of a composition of which viscosity at room temperature is in the range of 0.5 to 10 mPa·s.

5. The microlens substrate as claimed in claim 1, wherein a thickness of the coating layer is in the range of 0.1 to 5.0 µm.

6. A method of manufacturing a microlens substrate for use in an opposed substrate for a liquid crystal panel, the method comprising the steps of:
    preparing a substrate with concave portions having a plurality of concave portions on one of the major surfaces thereof;
    applying a convex lens substrate formation composition having fluidity onto the one major surface of the substrate with concave portions where the plurality of concave portions are formed;
    obtaining a convex lens substrate having a plurality of convex lenses by solidifying the convex lens substrate formation composition;
    applying a coating layer formation composition having a fluidity and containing a polysilazane compound onto the surface of the convex lens substrate which does not face the substrate with concave portions; and
    forming a coating layer on the surface of the convex lens substrate by curing the coating layer formation composition by reacting the polysilazane compound with water.

7. A liquid crystal panel provided with a microlens substrate for use in an opposed substrate for the liquid crystal panel, wherein:
    the microlens substrate comprising a substrate with concave portions having a plurality of concave portions on one of the major surfaces thereof; a convex lens substrate having convex lenses on one of the major surfaces thereof, each of the convex lenses having a shape corresponding to each of the concave portions, and a coating layer, wherein the convex lens substrate is provided with respect to the substrate with concave portions so that the convex lenses are opposed to the corresponding concave portions of the substrate with concave portions, respectively;

the coating layer is provided on the other major surface of the convex lens substrate; and the coating layer is mainly constituted of a product material produced by a reaction of a polysilazane compound with water.

8. A projection type display apparatus having a light source and at least one light valve, wherein:

the light valve includes a liquid crystal panel provided with a microlens substrate for use in an opposed substrate for a liquid crystal panel;

the microlens substrate includes a substrate with concave portions, a convex lens substrate having microlenses each having a shape corresponding to each of the concave portions of the substrate with concave portions, and a coating layer provided on the convex lens substrate;

the convex lens substrate is provided with respect to the substrate with concave portions so that the convex lenses are opposed to the corresponding concave portions of the substrate with concave portions, respectively;

the coating layer is provided on the surface of the convex lens substrate which does not face the substrate with concave portions; and the coating layer is mainly constituted of a product material produced by a reaction of a polysilazane compound with water.

* * * * *

UNITED STATES PATENT AND TRADEMARK OFFICE
CERTIFICATE OF CORRECTION

PATENT NO. : 7,345,821 B2
APPLICATION NO. : 11/513975
DATED : March 18, 2008
INVENTOR(S) : Nobuyuki Miyao It is certified that error appears in the above-identified patent and that said Letters Patent is hereby corrected as shown below:

Column 20, Line 50, after "which" insert the following:
--a plurality of openings 21 are formed is formed on the convex lens substrate 12 of the microlens substrate 1 obtained as described above. In this case, the black matrix 2 is formed so that the plurality of openings 21 respectively correspond to the microlenses 121, more specifically, so that an optical axis Q of each of the microlenses 121 passes through the corresponding opening 21 formed in the black matrix 2 (see FIG. 1).

For example, it is possible to form the black matrix 2 in which the plurality of openings 21 are formed on the microlens substrate 1 (that is, convex lens substrate 12) as follows.

A thin film to be the black matrix 2 is first formed on the convex lens substrate 12 by means of a vapor film formation method such as a spattering method. Next, a resist film is formed on the thin film to be the black matrix 2. The resist film is subjected to exposure so that each of the plurality of openings 21 in the black matrix 2 is formed at the position of the corresponding microlens 121 (or the concave portion 111), whereby a pattern for the openings 21 is formed in the resist film. Next, the convex lens substrate 12 with the resist film is subjected to a wet etching process, whereby only portions that become the openings 21 are removed from the thin film. The resist film is then removed. In this regard, in the case where the thin film to be the black matrix 2 is formed of an Al alloy, it is possible to use a phosphate system etchant as a releasing liquid for the wet etching process. Alternatively, the black matrix 2 in which the openings 21 are formed may be formed by means of a dry etching process using a chloride system gas appropriately.

<2> Next, a transparent conductive film (common electrode) 3 is formed on the convex lens substrate 12 so as--

Column 21, Line 16, after "crystal", delete the following (Lines 17-48):
"a plurality of openings 21 are formed is formed on the convex lens substrate 12 of the microlens substrate 1 obtained as described above. In this case, the black matrix 2 is formed so that the plurality of openings 21 respectively correspond to the microlenses 121, more specifically, so that an optical axis Q of each of the microlenses 121 passes through the corresponding opening 21 formed in the black matrix 2 (see FIG. 1).

For example, it is possible to form the black matrix 2 in which the plurality of openings 21 are formed on the microlens substrate 1 (that is, convex lens substrate 12) as follows.

UNITED STATES PATENT AND TRADEMARK OFFICE
CERTIFICATE OF CORRECTION

PATENT NO.       : 7,345,821 B2
APPLICATION NO.  : 11/513975
DATED            : March 18, 2008
INVENTOR(S)      : Nobuyuki Miyao It is certified that error appears in the above-identified patent and that said Letters Patent is hereby corrected as shown below:

A thin film to be the black matrix 2 is first formed on the convex lens substrate 12 by means of a vapor film formation method such as a spattering method. Next, a resist film is formed on the thin film to be the black matrix 2. The resist film is subjected to exposure so that each of the plurality of openings 21 in the black matrix 2 is formed at the position of the corresponding microlens 121 (or the concave portion 111), whereby a pattern for the openings 21 is formed in the resist film. Next, the convex lens substrate 12 with the resist film is subjected to a wet etching process, whereby only portions that become the openings 21 are removed from the thin film. The resist film is then removed. In this regard, in the case where the thin film to be the black matrix 2 is formed of an Al alloy, it is possible to use a phosphate system etchant as a releasing liquid for the wet etching process. Alternatively, the black matrix 2 in which the openings 21 are formed may be formed by means of a dry etching process using a chloride system gas appropriately.
<2> Next, a transparent conductive film (common electrode) 3 is formed on the convex lens substrate 12 so as"

Signed and Sealed this

Seventeenth Day of March, 2009

JOHN DOLL
*Acting Director of the United States Patent and Trademark Office*